US012530751B2

(12) United States Patent
Tam

(10) Patent No.: US 12,530,751 B2
(45) Date of Patent: Jan. 20, 2026

(54) COLOR ENHANCEMENT ALGORITHM FOR COLOR-DEFICIENT PEOPLE

(71) Applicant: Apple Inc., Cupertino, CA (US)

(72) Inventor: Honkai Tam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 17/943,430

(22) Filed: Sep. 13, 2022

(65) Prior Publication Data

US 2024/0087099 A1 Mar. 14, 2024

(51) Int. Cl.
*G06T 5/77* (2024.01)
*G06T 7/90* (2017.01)

(52) U.S. Cl.
CPC ............. *G06T 5/77* (2024.01); *G06T 7/90* (2017.01); *G06T 2200/24* (2013.01)

(58) Field of Classification Search
CPC ......... G06T 5/77; G06T 7/90; G06T 2200/24; G06T 5/90; G06T 2207/10016; G06T 2207/10024; G09B 21/008; H04N 1/60
USPC ........................................................ 382/167
See application file for complete search history.

(56) References Cited

U.S. PATENT DOCUMENTS

| | | | | |
|---|---|---|---|---|
| 2004/0240749 | A1* | 12/2004 | Miwa | G06T 7/12 382/173 |
| 2005/0041868 | A1* | 2/2005 | Chupeau | G06V 40/161 382/118 |
| 2006/0061586 | A1* | 3/2006 | Brulle-Drews | G06F 3/04897 345/594 |
| 2012/0002000 | A1* | 1/2012 | Guerrero | H04N 19/172 348/241 |
| 2013/0201496 | A1* | 8/2013 | Boggs | G09B 21/008 358/1.9 |
| 2014/0066196 | A1 | 3/2014 | Crenshaw | |
| 2014/0118585 | A1* | 5/2014 | Naccari | H04N 23/12 348/270 |
| 2016/0189672 | A1 | 6/2016 | Demos | |
| 2019/0098218 | A1* | 3/2019 | Sakai | H04N 23/63 |
| 2021/0183105 | A1 | 6/2021 | Sneyers et al. | |
| 2021/0304454 | A1* | 9/2021 | Sasaki | G09G 3/2003 |

* cited by examiner

*Primary Examiner* — Stephen P Coleman
(74) *Attorney, Agent, or Firm* — Fletcher Yoder, P.C.

(57) ABSTRACT

An electronic device includes a display and processing circuitry that is communicatively coupled to the display. The processing circuitry is configured to receive source image data indicative of color components for a pixel of the source image data. The color components include a maximum color component, a middle color component, and a minimum color component. The processing circuitry is also configured to determine a classification for the pixel based at least in part on the color component and to generate adjusted image data by modifying one or more of the color components based at least in part on the classification.

20 Claims, 26 Drawing Sheets
(13 of 26 Drawing Sheet(s) Filed in Color)

130A

COLOR ENHANCEMENT ALGORITHM FOR COLOR-DEFICIENT PEOPLE

BACKGROUND

The present disclosure generally relates to image processing, and, more particularly, to techniques for modifying image data to generate content that, when displayed, is perceivable by people with regular vision and those that suffer from color vision deficiency (e.g., colorblindness).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information, for example, as text, still images, and/or video based on corresponding image data. Some users may perceive image content different than others. For example, approximately eight percent of men and less than one percent of women suffer from color vision deficiency, which is also known as colorblindness. For users with color vision deficiency, it may be difficult to perceive which colors are present in displayed content or to discern between the colors of the display content.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to processing techniques that may be utilized when performing image processing. For example, the techniques described herein may be utilized as part of a process for altering image data to enhance the visibility of images (e.g., content shown on a display) for users with color vision deficiency, such as colorblindness.

In particular, the techniques described herein relate to modifying image data to generate image data that, when displayed as image content, enables users with color vision deficiency to discern, or better discern, between colors in the image content. These techniques may be applied in a user-specific manner so that each user may alter settings for how image data is modified so as to generate image data that best suits the user. For example, image content for a pixel in a display may have color components (e.g., RGB values) that define the amount of red, green, and blue to be displayed at the pixel. Based on which of these colors is the largest color component, which of these colors is the middle color component, and which of these colors is the minimum color component, original image data may be modified to generate image data that, when displayed, better enables a user with color vision deficiency to discern between colors (e.g., compared to an image generated from the original or unmodified image content). For instance, as described below, the middle color component, minimum color component, or both the middle color component and the minimum color component may be modified to enable users with color vision deficiency to better distinguish between colors in image content.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure describes techniques for displaying content in a manner that is more viewable to users with color vision deficiency, which can also be referred to as colorblindness. In particular, a user may set certain settings, and image data may be modified in a user-specific manner based on the settings. When displayed, color(s) in the displayed content are relatively more discernable to the user, for example, compared to other techniques or algorithms used to adapt image data for those with color vision deficiency.

Figure 1:
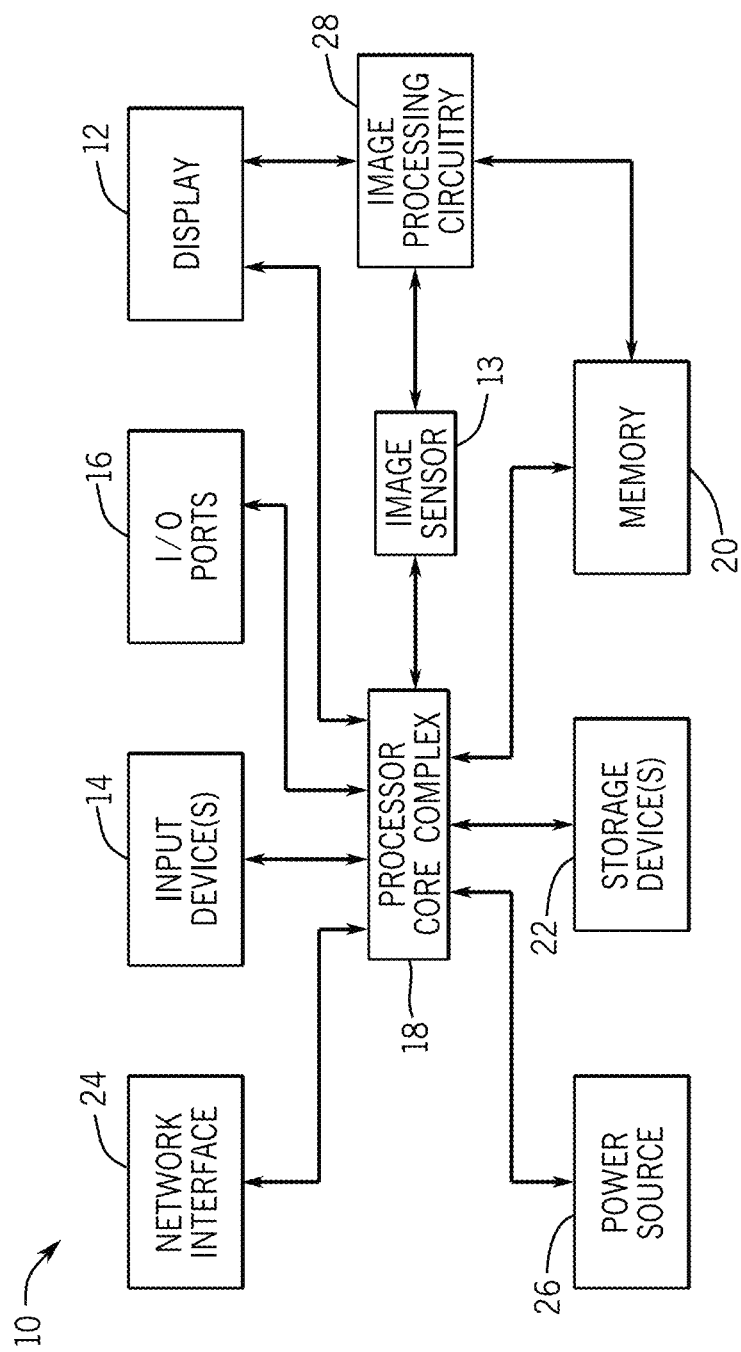
FIG. 1 is a block diagram of an electronic device, in accordance with an embodiment.

With the foregoing in mind, an electronic device 10 (e.g., computing device) that may utilize an electronic display 12 to display image frames based on image data and/or an image sensor 13 (e.g., a camera) to capture image data is described in FIG. 1. As will be described in more detail below, the electronic device 10 may be any suitable computing device, electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in the electronic device 10.

The electronic device 10 includes the electronic display 12, an image sensor 13, one or more input structures 14 (e.g., input devices), one or more input/output (I/O) ports 16, a processor core complex 18 having one or more processor(s) or processor cores, image pre-processing circuitry, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixels may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

The processor core complex 18, image processing circuitry 28, or both the processor core complex 18 and the image processing circuitry 28 may execute instructions stored in local memory 20 and/or the main memory storage device 22 to perform certain image processing operations. For example, the processor core complex 18 and the image processing circuitry 28 may encode image data captured by the image sensor 13 and/or decode image data for display on the electronic display 12. And, as discussed in greater detail below, the processor core complex 18 and/or image processing circuitry 28 may modify image data to generate adjusted image data that, when displayed, is more viewable by users with color vision deficiency. As such, the processor core complex 18 and image processing circuitry 28 may include one or more general purpose microprocessors, one or more application specific processors (ASICs), one or more field programmable logic arrays (FPGAs), or any combination thereof. Additionally, in some embodiments, the image processing circuitry 28 may be included (partially or completely) in the processor core complex 18.

The local memory 20 and/or the main memory storage device 22 may be tangible, non-transitory, computer-readable mediums that store instructions executable by and data to be processed by the processor core complex 18 and the image pre-processing circuitry. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Using the network interface 24, the electronic device 10 may communicatively couple to a network and/or other computing devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

The processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output encoded image data to the portable storage device and/or receive encoded image data from the portable storage device.

In addition to enabling user inputs, the electronic display 12 may include one or more display panels. Each display panel may be a separate display device or one or more display panels may be combined into a same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the electronic device 10. The input structures 14 may include buttons, keyboards, mice, trackpads, and/or the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may present visual representations of information by display images (e.g., image frames), such as a graphical user interface (GUI) of an operating system, an application interface, a still image, or video content. As described above, the electronic display 12 may display an image based on corresponding image data. In some embodiments, the image data may be received from other electronic devices 10, for example, via the network interface 24 and/or the I/O ports 16. Additionally or alternatively, the image data may be generated by electronic device 10 using the image sensor 13. In some embodiments, image sensor 13 may digitally capture visual representations of proximate physical features as image data.

The image data may be encoded (e.g., compressed), for example, by the electronic device 10 that generated the image data, to reduce number of memory addresses used to store and/or bandwidth used to transmit the image data. Once generated or received, the encoded image data may be stored in local memory 20. Accordingly, to a display image corresponding with encoded image data, the processor core complex 18 or other image data processing circuitry may retrieve encoded image data from local memory 20, decode the encoded image data, and instruct the electronic display 12 to display image frames based on the decoded image data.

Figure 2:
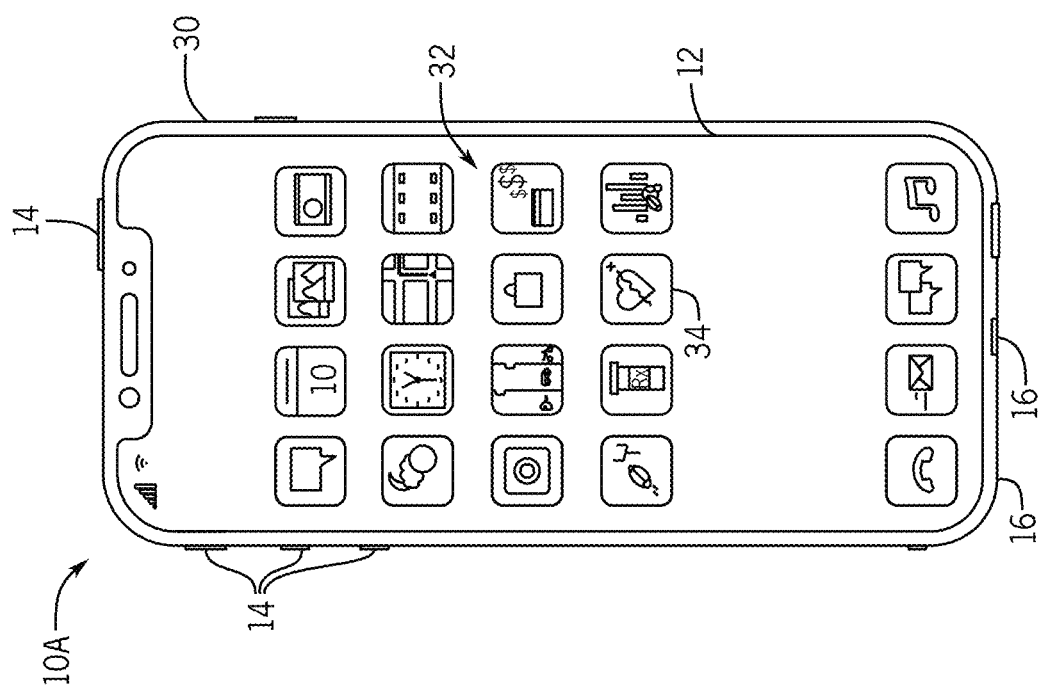
FIG. 2 is an example of the electronic device of FIG. 1, in accordance with an embodiment.

As noted above, the electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
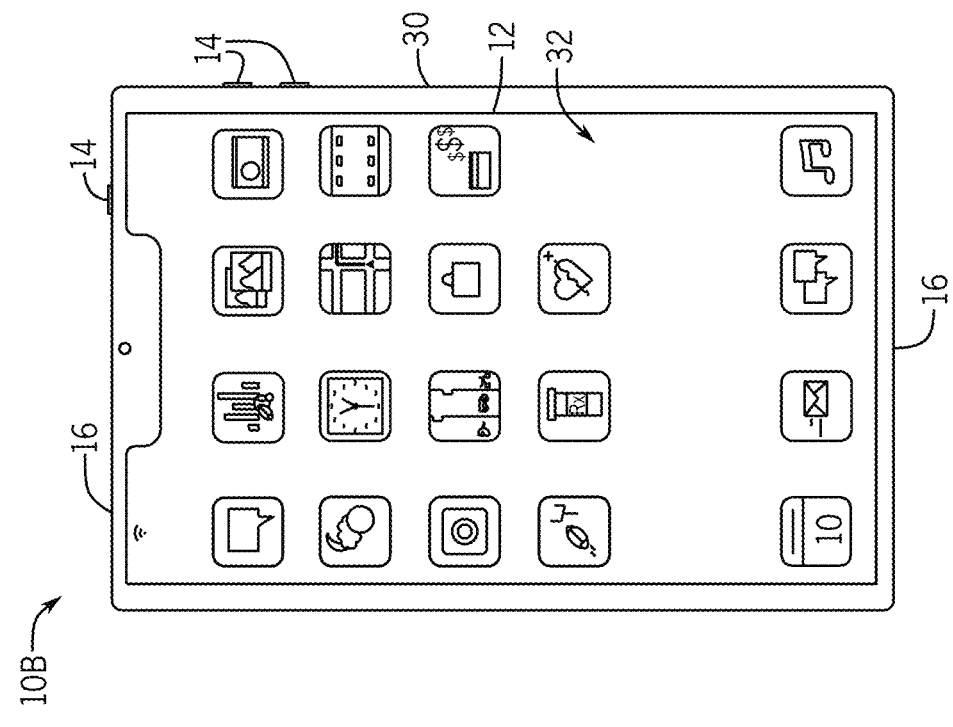
FIG. 3 is another example of the electronic device of FIG. 1, in accordance with an embodiment.
Figure 4:
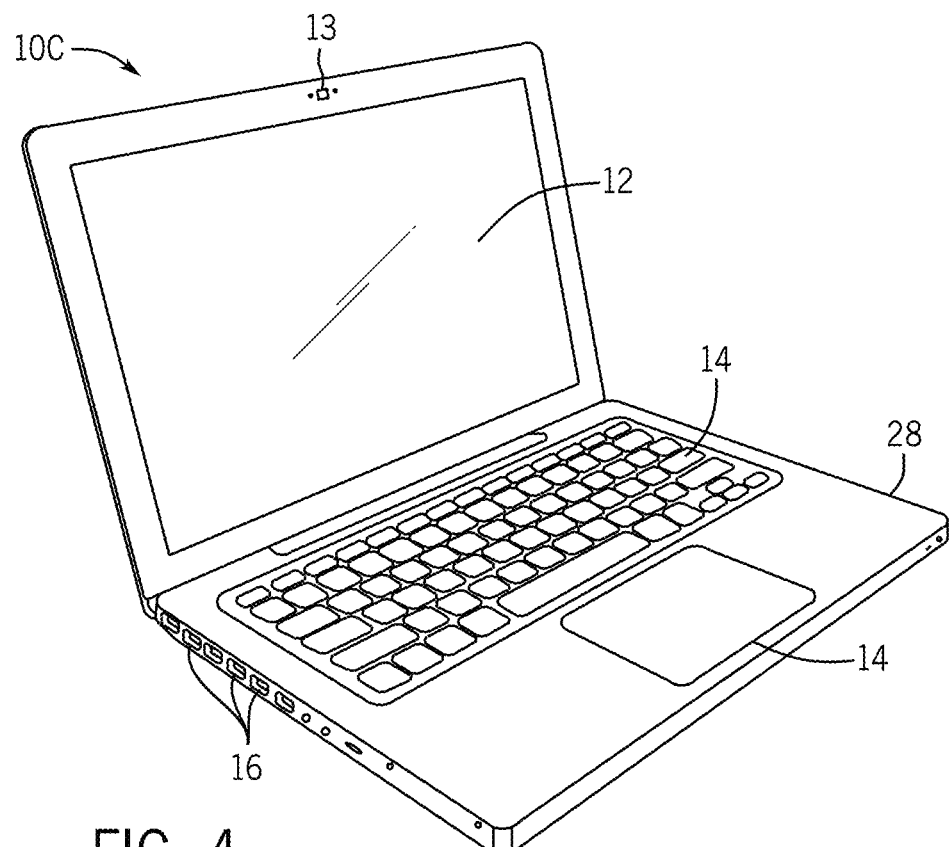
FIG. 4 is another example of the electronic device of FIG. 1, in accordance with an embodiment.
Figure 5:
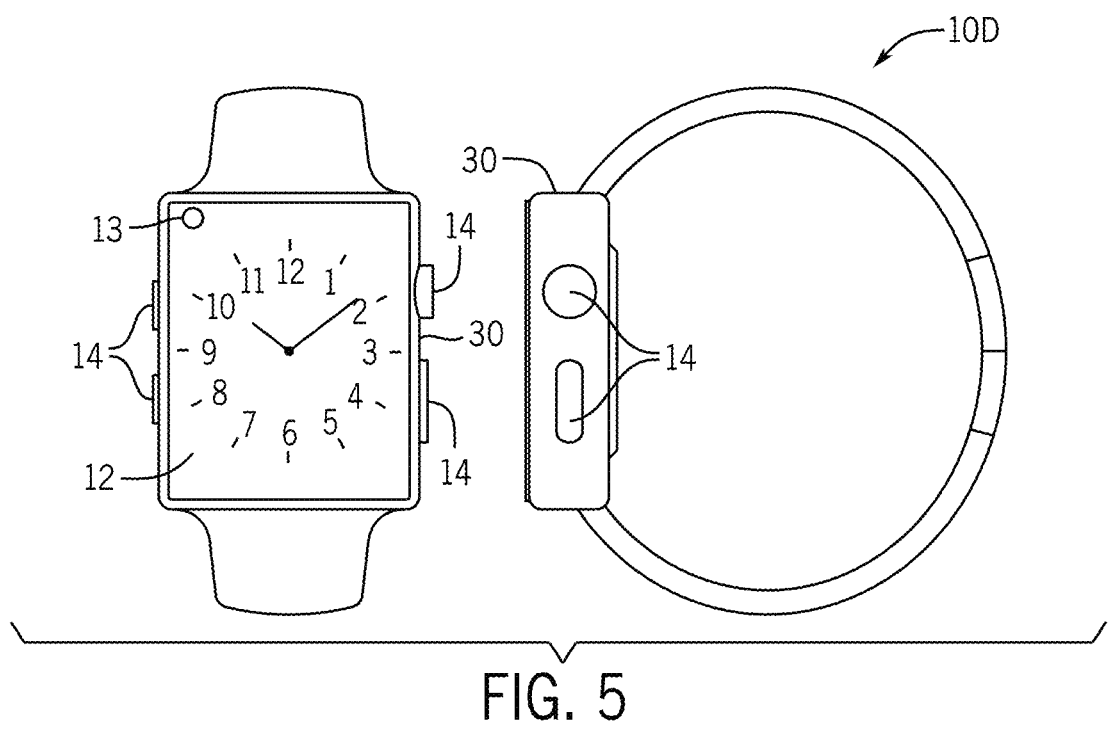
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
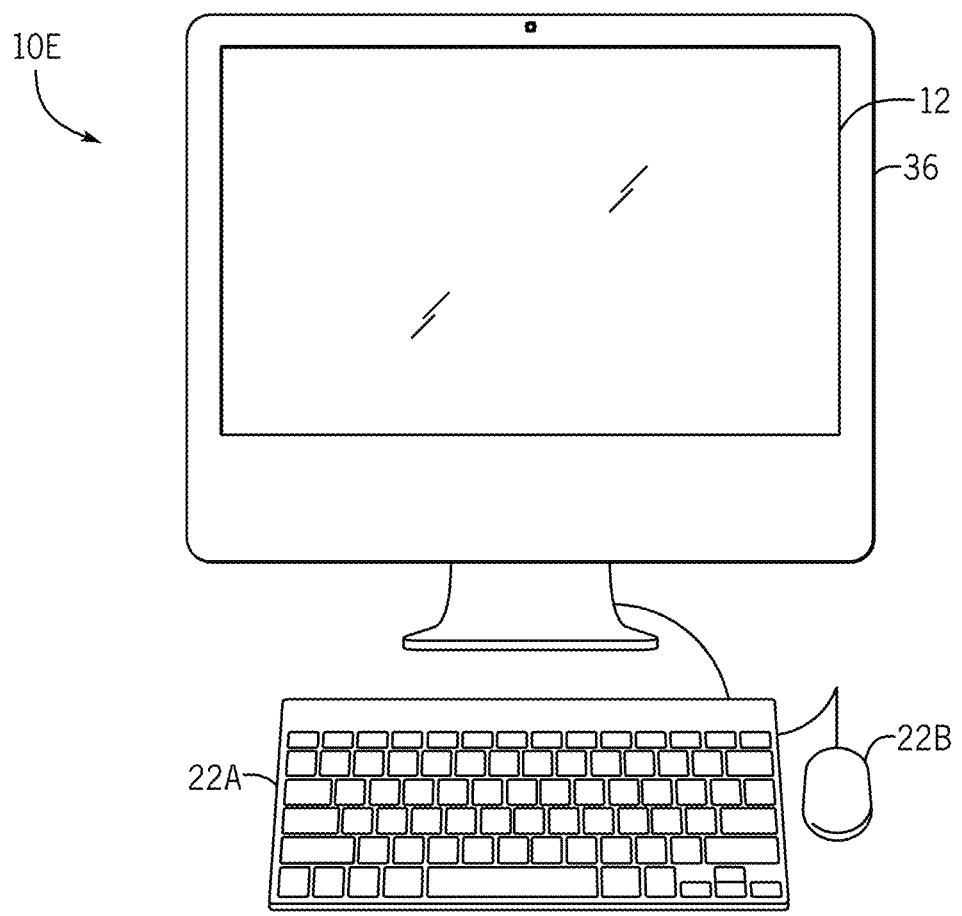
FIG. 6 is a front view of a desktop computer representing another embodiment of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

As described above, image data may modified to cause content that is generated from the modified image data and displayed to be more viewable to users with color vision deficiency (e.g., colorblind). More specifically, the techniques described herein may enable user-specific settings to be set and utilized to modify image data (e.g., color components of image data) to reduce or eliminate zones of confusion that a user with color vision deficiency may experience. A zone of confusion may exist when a user cannot discern what a particular color is. For example, a user with red-green colorblindness may be unable to discern whether particular content is red or green.

Figure 7:
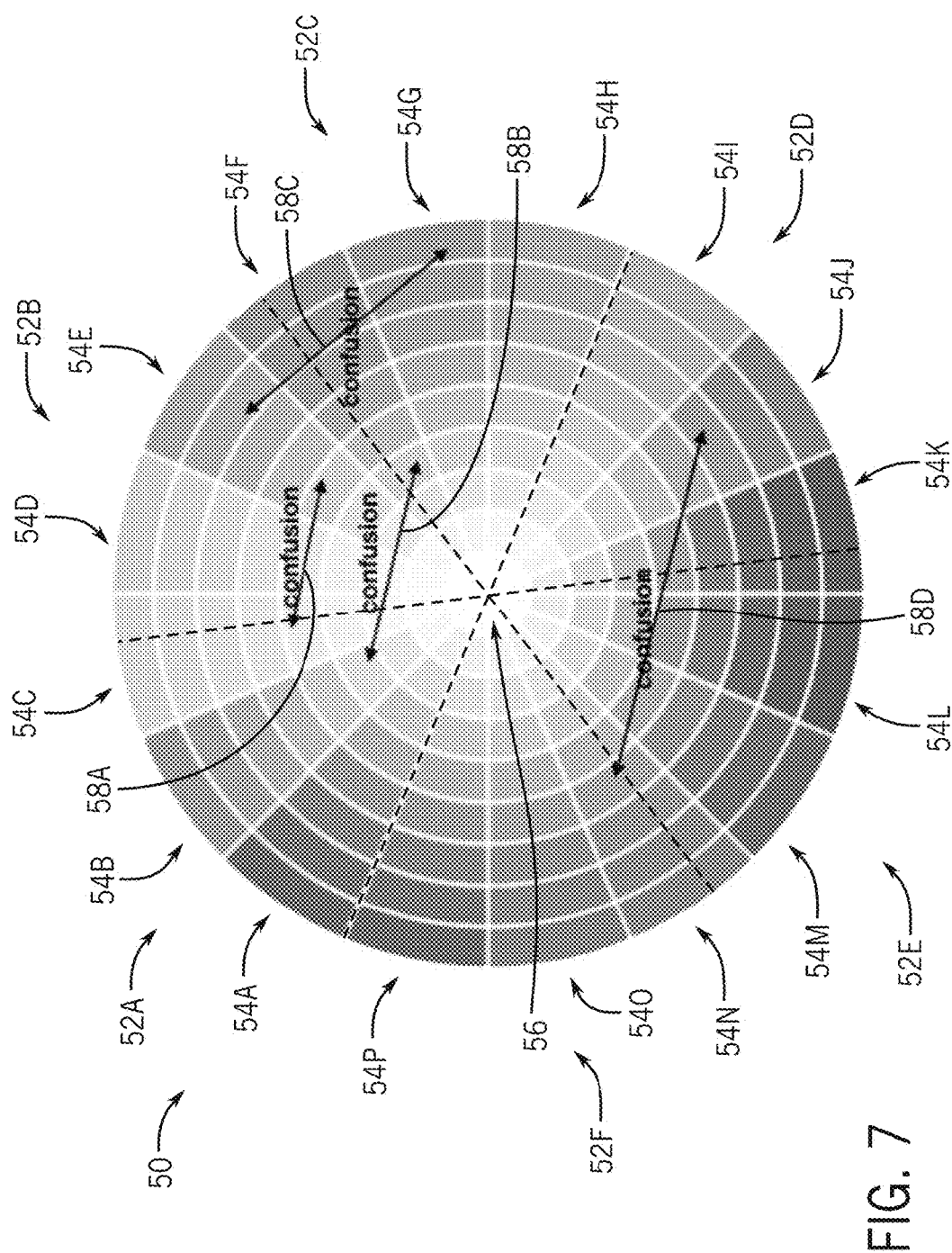
FIG. 7 is a diagram of a color wheel that is subdivided into regions and sections, in accordance with an embodiment.

Bearing this in mind, FIG. 7 is a diagram of a color wheel 50 that includes various regions 52 (e.g., regions 52A-52F) and sections 54 (e.g., sections 54A-54P). Each section 54 (referring to any of the sections 54A-54P) include hues or shades of a color of the section 54, which generally become less saturated (e.g., paler) the closer to a center 56 of the color wheel 50 one looks. The color wheel 50 may be referenced below when discussing various aspects of the present disclosure. Furthermore, while the color wheel 50 has six regions 52 and the techniques described below are based on having six regions 52, in other embodiments, the color wheel 50 may be subdivided into fewer or more than six regions 52, and the techniques described below may accordingly be modified based on the number of regions utilized. For example, in other embodiments, the number of regions 52 may be two, three, four, five, or an integer between seven and thirty-six, inclusive.

As also illustrated, the color wheel 50 includes zones of confusion 58 (e.g., zones of confusion 58A-58D). The zones of confusion 58 are representative of portions of the color wheel 50 (e.g., two individual hues or two portions of two sections 54 of the color wheel 50) that people with color vision deficiency may experience difficulty discerning or be unable to discern. For example, zones of confusion 58A, 58B may occur when a particular hue is near a yellow hue (e.g., near section 54B). As another example, another zone of confusion 58C may exist for hues of green (e.g., near section 54F). For these zones of confusion 58 (i.e., zones of confusion 58A-58C), a user may be unable to discern whether a particular hue is closer to a red hue or a green hue. As another example, another zone of confusion 58D may exist for those who are unable (or less able) to differentiate between blue-green and purple, which may occur for those with red-green colorblindness (e.g., due to being unable to discern whether a particular hue is a mixture of blue with red or blue with green). Furthermore, zones of confusion may exist for less saturated hues. Indeed, as one progresses closer to the center 56 of the color wheel 50 and the hues become less saturated, those with color vision deficiency may be unable to discern between gray hues and blue-green hues as well as between gray hues and blue-red hues.

As noted above, the present disclosure describes techniques for eliminating zones of confusion (e.g., zones of confusion 58A-58D), which may thereby enable electronic devices to generate and display content with colors discernable to those with color vision deficiency. Before describing the implementation of such techniques, several examples of images will be discussed to show how images generated using the techniques of the present disclosure compare with images generated using other techniques.

Figure 8A:
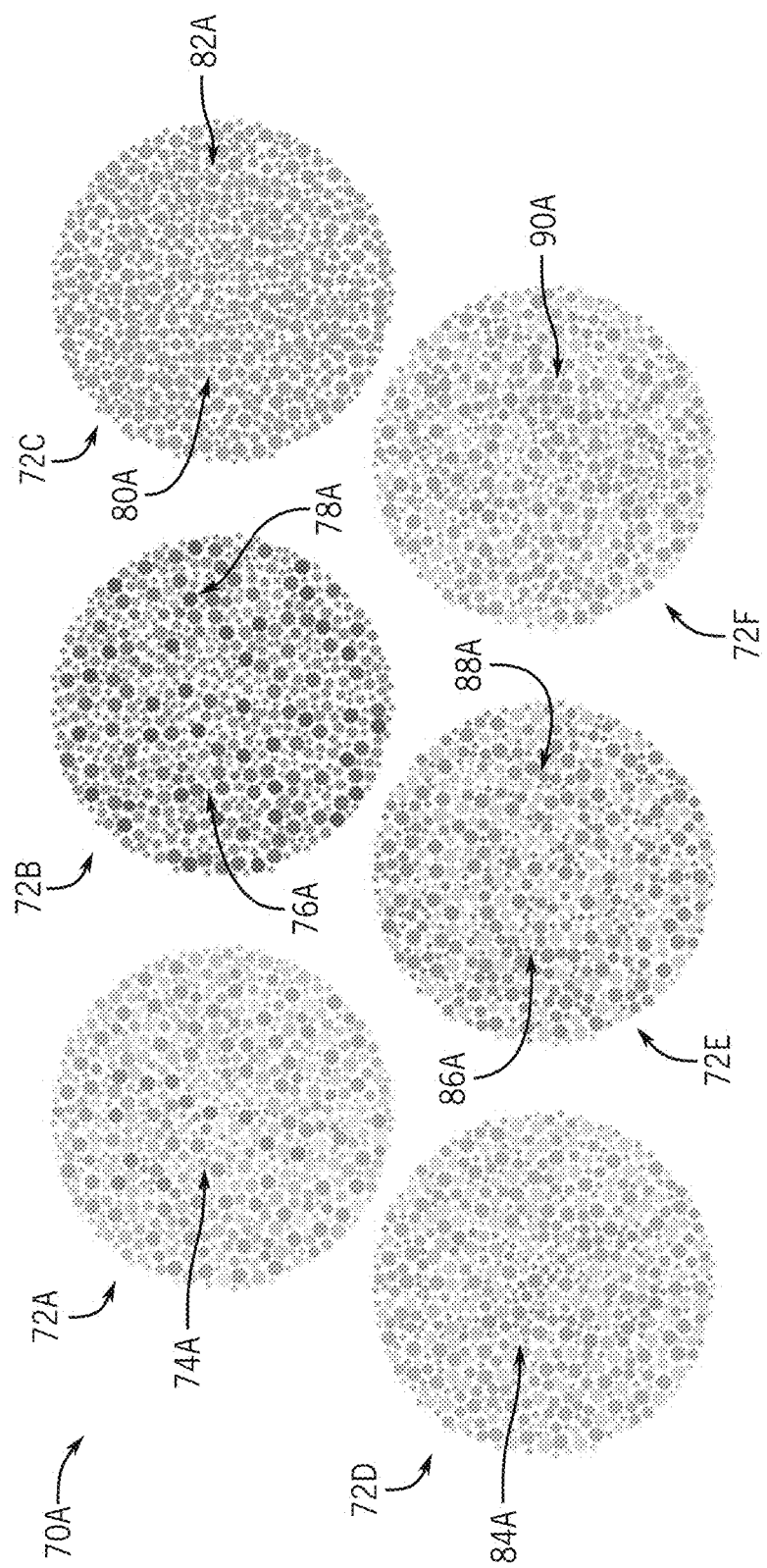
FIG. 8A is a first original image that may be displayed on the display of the electronic device of FIG. 1, in accordance with an embodiment.

FIG. 8A is an image 70A that is known as an Ishihara template. The image 70A includes six samples 72 (e.g., samples 72A-72F), each of which is a larger circle that includes 1) a "background" composed of smaller circles of one or more colors and 2) one or more numerals surrounded by the background. For example, in a first sample 72A, the background includes red, orange, and yellow hues along with a numeral 74A ("7") that is composed of green hues. A second sample 72B includes a background of several brown hues (e.g., tan hues). The second sample 72B also includes a numeral 76A ("1") that includes pink and purple hues and a numeral 78A "3" that includes pink and red hues. A third sample 72C includes a gray background with numerals 80A, 82A ("1" and "6," respectively) of an orange hue. A fourth sample 72D includes a background with yellow and green hues and a numeral 84 ("8") composed of pink and orange hues. A fifth sample 72E includes a background made of red and orange hues. The fifth sample 72E also includes a numeral 86A ("1") composed of green hues and another numeral 88A ("2") composed of green and yellow hues. The image 70A also includes a sixth sample 72F that includes a background of green, yellow, and blue hues. The sixth sample 72F also includes a numeral 90A "9" that is formed by red or orange hues.

Figure 8B:
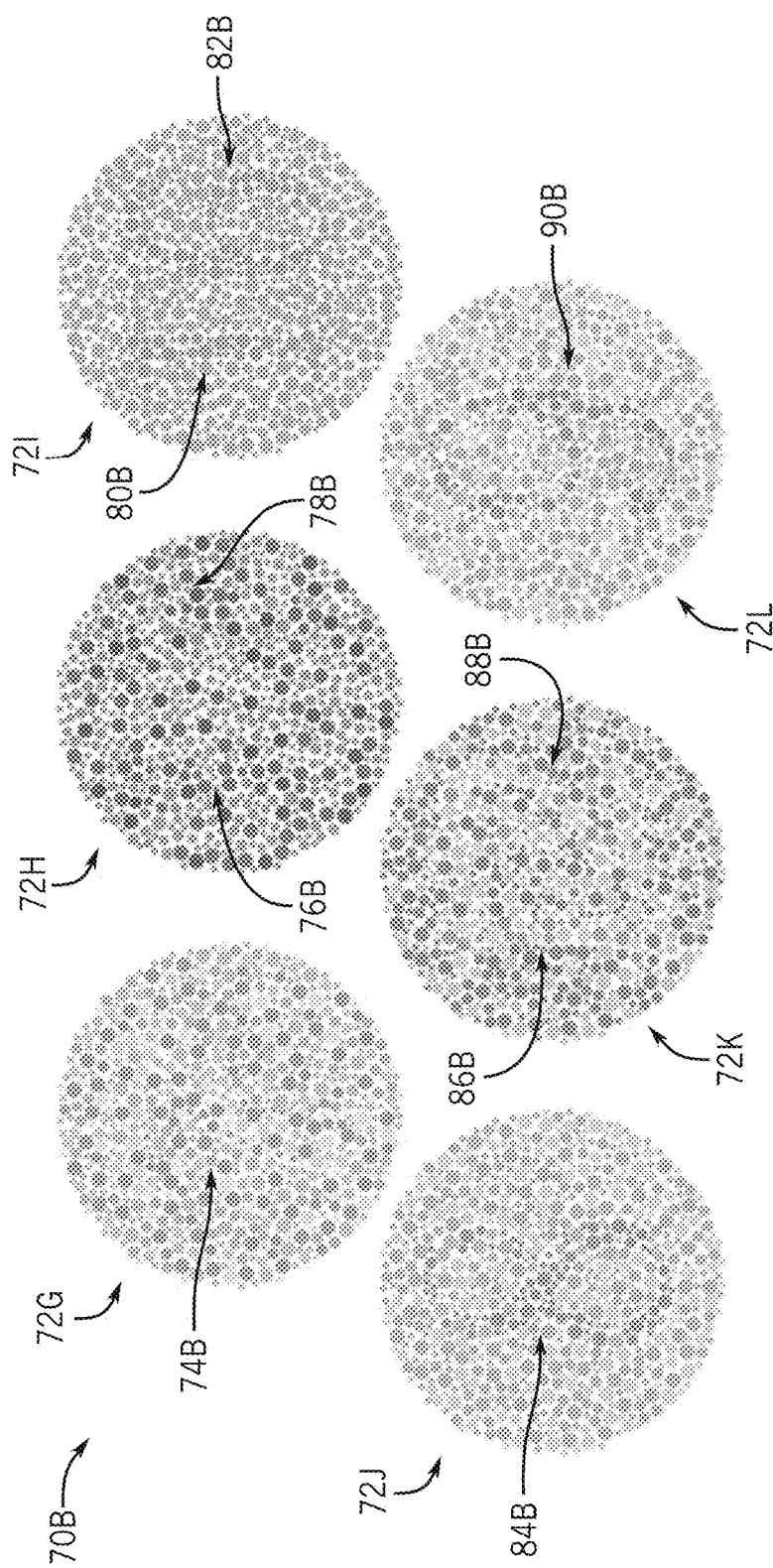
FIG. 8B is an image produced using the Dalton algorithm on image data for the first original image, in accordance with an embodiment.

FIG. 8B is an image 70B that is generated by utilizing a technique called the Dalton algorithm to modify the image 70A. The image 70B includes samples 72G-72L, which respectively correspond to samples 72A-72F of FIG. 8A. More specifically, the image 70B is generated using the Dalton algorithm for those with protanomaly (also known as protanopia), which is a form of red-green color deficiency in which the individual is missing (or has malfunctioning) long cones. Long cones are photoreceptors in the human eye that are responsible for detecting relatively long wavelengths in the visible color spectrum, which correspond to red. The human eye also includes medium cones and short cones, which are respectively responsible for detecting green and blue wavelengths. A person with protanomaly may be confused between red-green, red-orange, blue-green, and gray. In the Dalton algorithm, pixels are converted from RGB (red, green, blue) components to a LMS (long, medium, short) scale. For protanopia, the long component is replaced by a linear combination of medium and short, while the medium and short components remain the same. While the image 70B is generated for those with protanomaly, it should also be noted that the Dalton algorithm may also be used for those with another form of red-green color deficiency, deuteranopia, which occurs when a person is missing or has malfunctioning medium cones. However, in either case the resulting image (e.g., image 70B) may cause the colors in an image to become distorted. For instance, compared to FIG. 8A, in FIG. 8B, the "warmer" colors (e.g., red, orange, and yellow hues) are generally represented in a "colder" manner, such as with hues of blue or green.

Figure 8C:
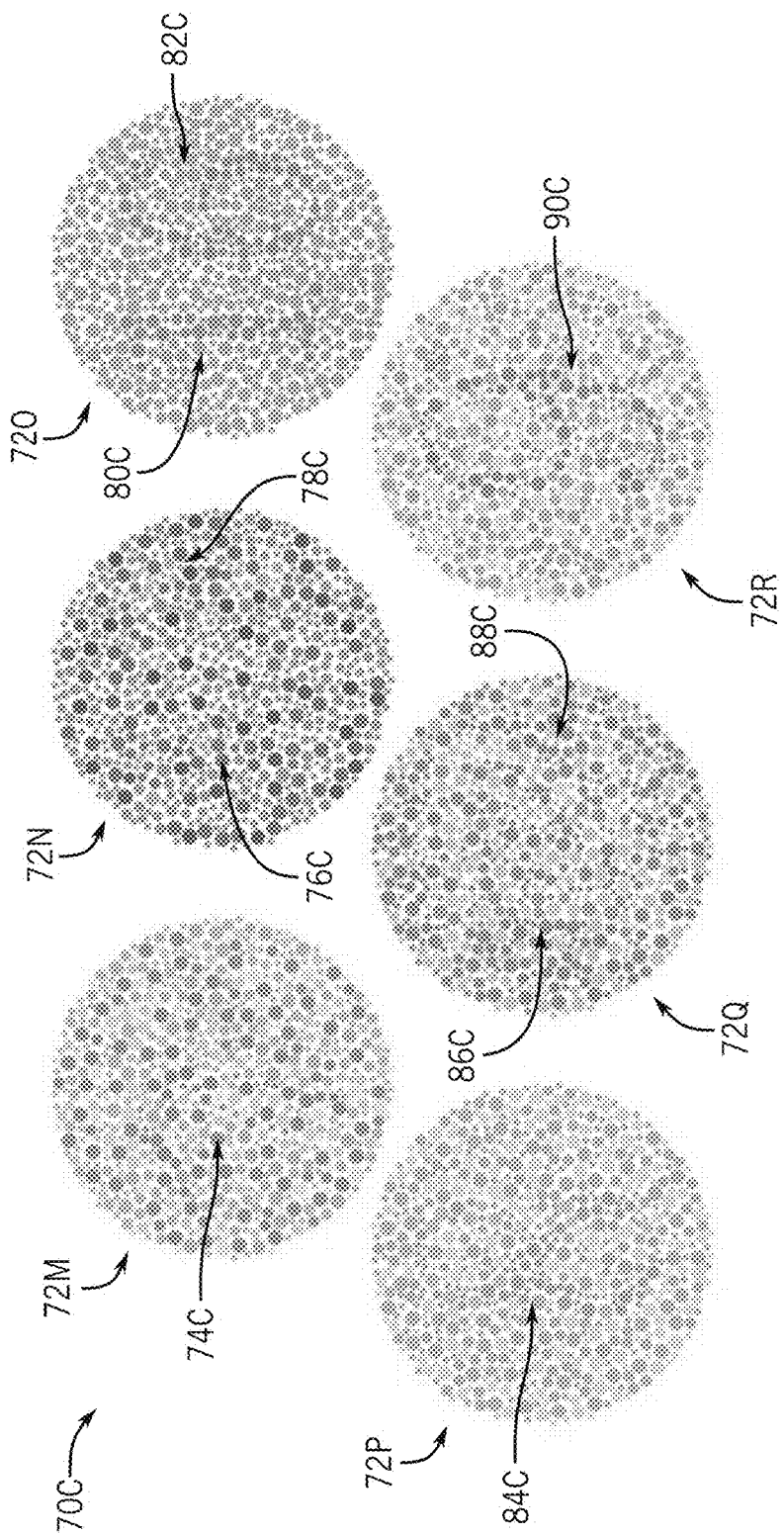
FIG. 8C is an image generated from adjusted image data that is generated using techniques of the present disclosure on image data for the first original image, in accordance with an embodiment.

FIG. 8C is image 70C that is generated by utilizing the techniques of the present disclosure on the image 70A of FIG. 8A with samples 72M-72R respectively corresponding to samples 72A-72F of FIG. 8A. As can be observed by comparing the image 70C to the image 70A and the image 70B, the colors utilized for the background and numerals (e.g., numerals 74C, 76C, 78C, 80C, 82C, 84C, 86C, 88C, 90C) are relatively more similar to those of the image 70A compared to the image 70B of FIG. 8B. Accordingly, the techniques described herein may enable hues from original images to be retained or utilize hues similar those in an original image while also providing content in a manner that enables a user with color vision deficiency to discern between the hues included in the image.

Figure 9A:
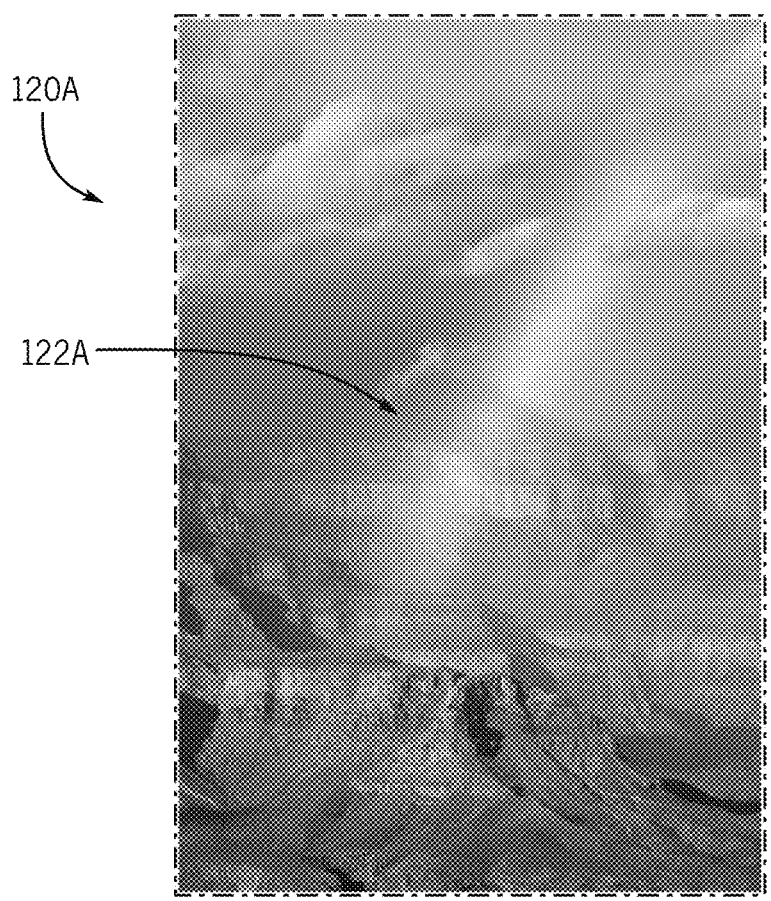
FIG. 9A is a second original image that may be displayed on the display of the electronic device of FIG. 1, in accordance with an embodiment.

FIG. 9A is an original image 120A that includes a rainbow 122B in the foreground and a canyon and sky with clouds in the background. The original image 120A is original image, meaning the original image 120A is generated or captured without utilizing an algorithm or technique to adjust colors, for example, to account for viewers with color vision deficiency. As illustrated, the rainbow 122A includes a red, orange, yellow, green, blue, indigo, and violet bands.

Figure 9B:
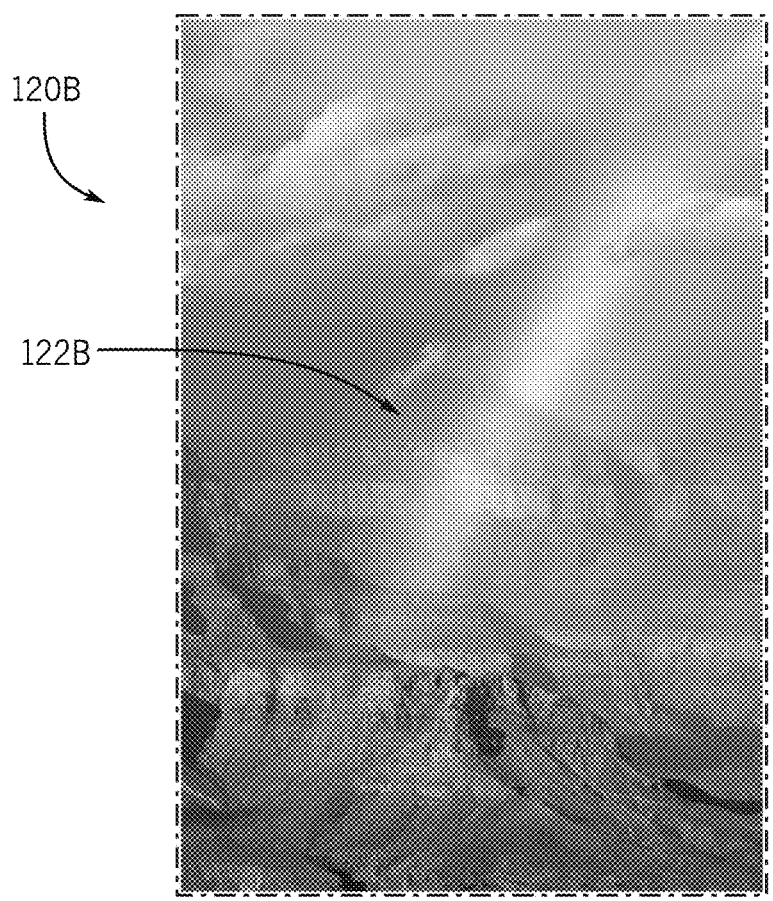
FIG. 9B is an image produced using the Dalton algorithm on image data for the second original image, in accordance with an embodiment.

FIG. 9B is an image 120B that is generated by using the Dalton algorithm on the original image 120A. As illustrated, in rainbow 122B in the image 120B, bands that were red, orange, yellow or green of FIG. 9A, are depicted in hues of yellow, while bands that were previously blue, indigo, or violet appear in hues or blue or purple (or blue-purple). Thus, similar to FIG. 8B relate to FIG. 8A, using the Dalton algorithm may cause some colors or hues to become completely different colors (e.g., instead of different shades of a color).

Figure 9C:
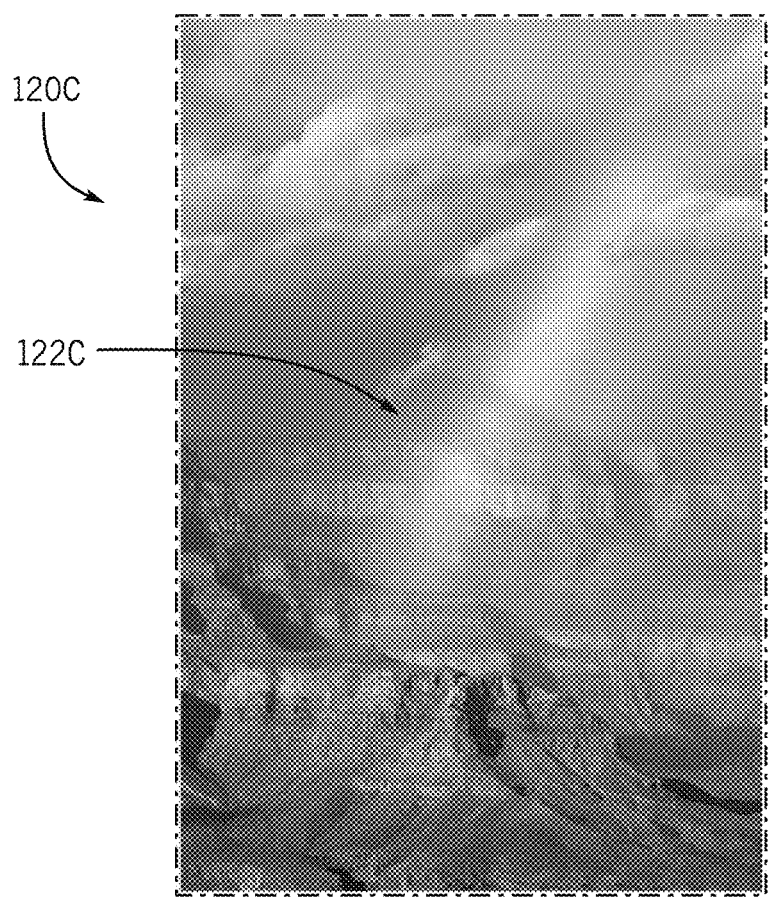
FIG. 9C is an image generated from adjusted image data that is generated using techniques of the present disclosure on image data for the second original image, in accordance with an embodiment.

FIG. 9C is an image 120C generated by using the techniques of the present disclosure on the original image 120A of FIG. 9A. In the image 120C, rainbow 122C includes individual bands for each of the colors (e.g., red, orange, yellow, green, blue, indigo, and violet) of the original image 120A using colors that are more similar to those of the original image 120A relative to the image 120B. Accordingly, the techniques described herein may enable hues from original images to be retained or utilize hues similar those in an original image while also providing content in a manner that enables a user with color vision deficiency to discern between the hues included in the image.

Figure 10A:
FIG. 10A is a third original image that may be displayed on the display of the electronic device of FIG. 1, in accordance with an embodiment.
Figure 10B:
FIG. 10B is an image produced using the Dalton algorithm on image data for the third original image, in accordance with an embodiment.

As another example, FIGS. 10A-10C will be discussed. In particular, FIG. 10A is an original image 130A that includes green elements (e.g., leaves, stems) and red elements (e.g., berries or fruits). In FIG. 10B, which is an image 130B generated by utilizing the Dalton algorithm on the original image 130A of FIG. 10A, the formerly red and green elements are both shown in hues of green, which may cause confusion for those with protanomaly or deuteranopia. In other words, a person with certain forms of color vision deficiency may be unable to discern between colors in the image 130B or recognize that certain elements of the image 130B were originally (e.g., as shown in FIG. 10A) different colors than those used in FIG. 10B.

Figure 10C:
FIG. 10C is an image generated from adjusted image data that is generated using techniques of the present disclosure on image data for the third original image, in accordance with an embodiment.

In contrast to FIG. 10B, FIG. 10C, which is an image 130C generated by using the techniques of the present disclosure on the original image 130A, retains separate green and red hues. Accordingly, viewers with color vision deficiency may be able to discern that different colors (e.g., green and red) are present in an image. Thus, as also noted above, the techniques described herein may enable hues from original images to be retained or utilize hues similar those in an original image while also providing content in a manner that enables a user with color vision deficiency to discern between the hues included in the image.

Keeping the foregoing in mind, an overview of features of the present application will be discussed. As shown in FIGS. 8C, 9C, and 10C (as respectively compared to FIGS. 8A, 9A, and 10A), the techniques of the present application cause the hue (e.g., a moving to a different section 54 of the color wheel 50), saturation (e.g., movement within a section 54 of the color wheel 50 towards or away from the center 56), or both to be performed (e.g., for each pixel (or a portion of the pixel) of an original image or hue (or portion of the hues) of the original image while also maintaining a similar appearance (e.g., in terms of hues being used) as the original image.

For example, referring to FIG. 7, the color wheel 50 may be divided into the regions 52, with each region 52 representing sixty degrees of the 360 degrees in the color wheel 50 (because the color wheel 50 is a circle). Region 52A may be referred to as a red-yellow region (representing zero to sixty degrees of the color wheel 50), region 52B may be referred to as a yellow-green region (representing sixty to 120 degrees of the color wheel 50), region 52C may be referred to as a green-cyan region (representing 120 to 180 degrees of the color wheel 50), region 52D may be referred to as a cyan-blue region (representing 180 to 240 degrees of the color wheel 50), region 52E may be referred to as a blue-violet region (representing 240 to 300 degrees of the color wheel 50), and region 52F may be referred to as a violet-red region (representing 300 to 360 degrees of the color wheel 50). As discussed below, a user may cause settings associated with each of the regions 52 to be modified, which alters the appearance of image content displayed on the electronic device 10. In other words, a user may modify settings to cause the electronic device 10 to modify image content to be adapted in a manner that enables image content to be provided in a manner that is preferred or best for that specific user.

Figure 11:
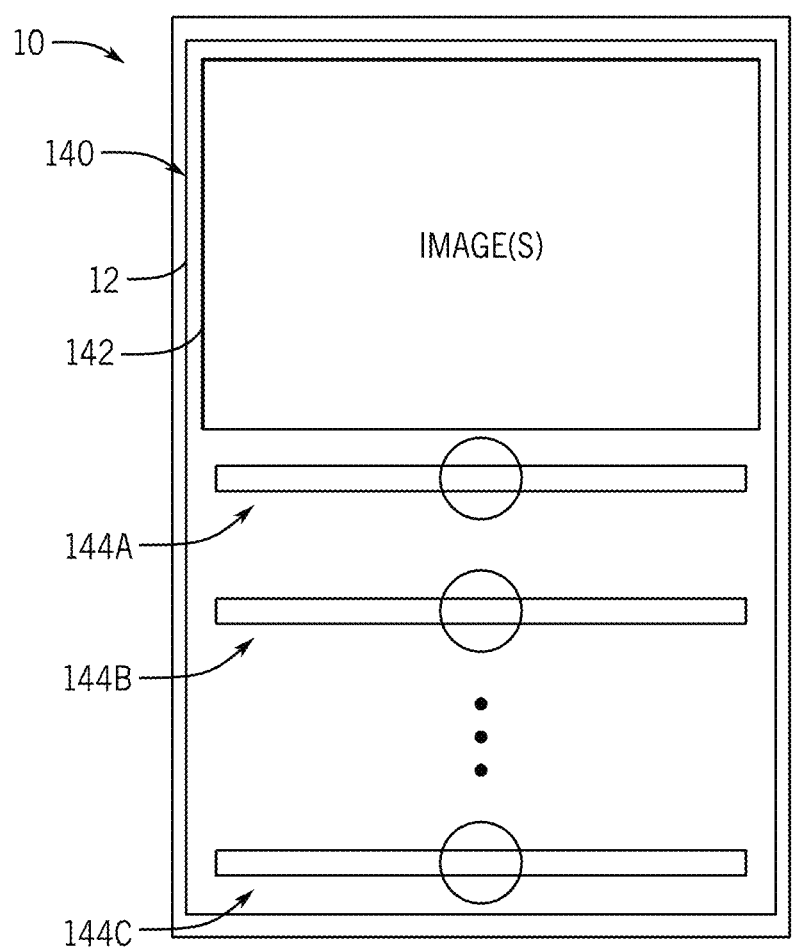
FIG. 11 is a front view of a graphical user interface, in accordance with an embodiment.

Keeping this in mind, FIG. 11 is a front view of a graphical user interface (GUI) 140 that may be displayed via the electronic display 12 of the electronic device 10. The GUI 140 may be accessible to the user of the electronic device 10, for example, from a settings menu (e.g., in a display settings section of a settings menu or a submenu within the display settings section). As illustrated, the GUI includes an image window 142 and sliders 144 (e.g., sliders 144A-144C). The image window 142 may display one or more images that may be modified as a user modifies the positioning of one or more of the sliders 144. For example, the image(s) initially include one or more of the images (portions thereof) included in FIGS. 8A, 9A, and 10A. Furthermore, while the sliders 144 are included in FIG. 11, it should be noted that, in other embodiments, another suitable GUI element may be used instead of a slider. That is, other GUI elements that a user many interact with or display (or otherwise indicate) user-selected values (or settings) may be used in lieu of the sliders 144. Furthermore, while the discussion below regarding the sliders 144 generally pertains to altering how image data is modified, it should be noted that the GUI 140 (or another GUI presented in a setting menu or submenu) may include a slider 144 or other GUI element with which a user many interact to enable a color vision deficiency mode, which may also be called a "colorblind mode". A user may make a user input to interact with such a GUI element (e.g., using the input devices 14 or a touch input in embodiments of the electronic device 10 in which the electronic display 12 is a touchscreen) to enable color vision deficiency mode, and, in response to the user input, the processor core complex 18, image processing circuitry 28, or the processor core complex 18 and the image processing circuitry 28 may begin to generate adjusted image data. In other words, the electronic device 10 may display original or source image data until a user input is made to activate color vision deficiency mode. In response, the color vision deficiency mode may be activated, and the adjusted image data may be generated and displayed. Furthermore, in one embodiment, display of the sliders 144, access to the sliders 144, or both may be prevented until a user input to activate color vision deficiency mode has been received.

The sliders 144 may include a first slider 144A, a second slider 144B, and a third slider 144C. The sliders 144, or a portion thereof, may be provided for each of the regions 52. As discussed below, a user may interact with the sliders 144 to alter how image data is modified, thereby enabling the user (e.g., a user with color vision deficiency) to cause image content to be altered in a user-specific manner that best enables the user to differentiate between colors in image data presented. The sliders 144 may be different types of sliders. For example, the first slider 144A may be a threshold slider, the second slider 144B may be a power slider, and the third slider 144C may be a minimum color (C_min) slider. Power sliders and threshold sliders may be provided for each of the regions 52, while three C_min sliders may be provided. Accordingly, in one embodiment, there may be fifteen sliders 144: six threshold sliders, six power sliders and three C_min sliders. In another embodiment, the GUI 140 may represent one of several GUIs that include sliders. For example, in one embodiment, sliders 144 specific to one of the regions 52 (e.g., a threshold slider and a power slider) may be provided in the GUI 140 along with the image window 142. A user may navigate (e.g., using a swiping motion on a device in which the electronic display 12 is a touchscreen) to a different GUI that also includes an image window (with one or more images, which could be the same as the image(s) provided in the image window 142) and additional sliders for another of the regions 52. Additionally, one of the GUIs may the C_min sliders. Thus, in such an embodiment, there may be seven GUIs 140: one for each of the six regions 52 and one for the C_min sliders. In another embodiment, all of the sliders 144 may be presented in the GUI 140 or accessible via the GUI 140 (e.g., by scrolling or swiping upwards or downwards within the GUI 140).

Before discussing the types of sliders 144 in more detail, it should be noted that in displays, such as the electronic display 12, pixels emit light to cause content to be displayed. Pixels may include subpixels such as red, green, and blue subpixels, which may respectively emit red, green, and blue light at different brightness levels. By utilizing red, green, and blue light at certain brightness levels, each of the hues of the color wheel 50 may be displayed. For example, image data may include values (e.g., RGB values) indicative of the brightness levels for each of the red, green, and blue subpixels of a given pixel, and a particular hue will be emitted with a particular combination of RGB values. As a more specific example, white light may correspond to RGB value 255, 255, 255, meaning each of the red, green, and blue subpixels emits light at a maximum brightness. Accordingly, the content to be emitted by a pixel may include red, green, and blue components. For a particular set of RGB values, there may be a maximum color component, a middle color component, and a minimum color component. For example, the color of jade green may have an RGB value of 0, 168, 107, in which case green (corresponding to the value of 168) is the maximum color component, blue (corresponding to the value of 107) is the medium color component, and red (corresponding to the value of zero) is the minimum color component. As discussed below, by modifying the position of one or more of the sliders, one or more of the RGB values associated with a pixel (e.g., original image data) may be modified in a user-specific manner, and image content generated and displayed using the modified image data may allow the user (e.g., a person with color vision deficiency) to better differentiate between colors in content provided on the electronic display 12.

Figure 12:
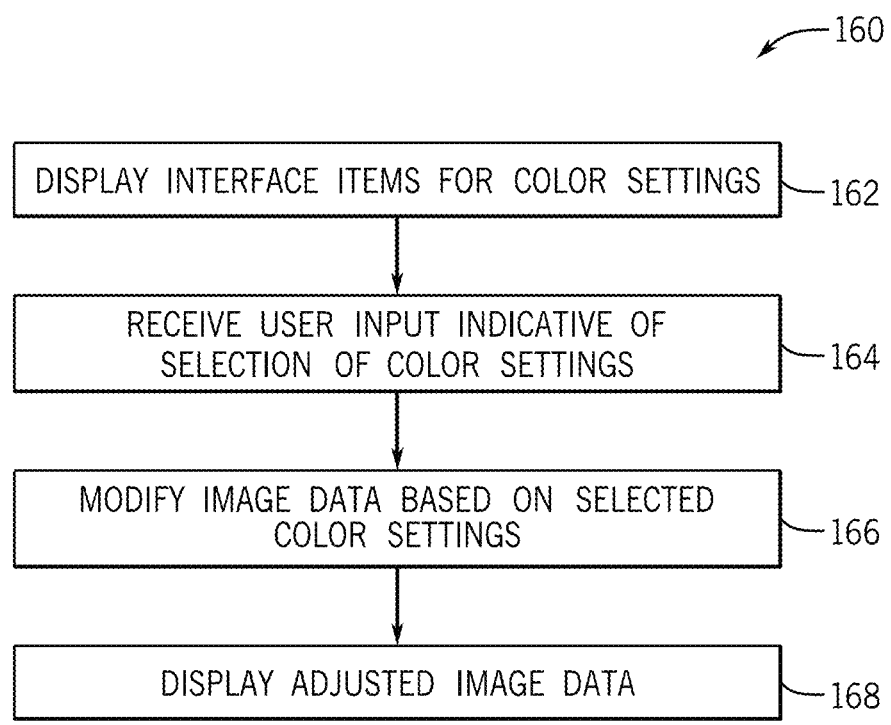
FIG. 12 is a flow diagram of a process 160 for generating and displaying adjusted image data based on a user's interaction with the graphical user interface of FIG. 11, in accordance with an embodiment.

To help provide more context for FIG. 11, FIG. 12 is a flow diagram of a process 160 for generating and displaying adjusted image data based on a user's interaction with the GUI 140. Generally, the process 160 includes displaying interface items for color settings (process block 162), receiving user input indicative of a selection of color settings (process block 164), modifying image data based on the selected color settings (process block 166), and displaying adjusted image data (process block 168). In some embodiments, the process 160 may be implemented at least in part based on circuit connections formed (e.g., programmed) in the processor core complex 18, the image processing circuitry 28, or both (e.g., partially or completely) the processor core complex 18 and the image processing circuitry 28. Additionally or alternatively, the process 160 may be implemented at least in part by executing instructions stored in a tangible non-transitory computer-readable medium, such as the local memory 20, using processing circuitry, such as the processor core complex 18, image processing circuitry 28, or both the processor core complex 18 and the image processing circuitry 28.

At process block 162, the processor core complex 18 may cause interface items for color settings to be displayed, for example, via the electronic display 12. The interface items may include the image window 142 and the sliders 144.

At process block 164, the processor core complex 18 may receive user input indicative of a selection of color settings. For example, the user may adjust the positioning of one of more of the sliders 144 using one of the input devices 14 or, in embodiments in which the electronic display 12 is a touchscreen, an interaction with the touchscreen (e.g., a swiping or sliding motion made using a finger).

At process block 166, the processor core complex 18, image processing circuitry 28, or both the processor core complex and the image processing circuitry 28 may modify image data based on the selected color settings (e.g., as indicated by the user input received at process block 164) to generate adjusted image data. Furthermore, at process block 168, the processor core complex 18, image processing circuitry 28, or both the processor core complex 18 and the image processing circuitry 28 may cause the adjusted image data to be presented, for instance, via the electronic display 12. For example, based on the color settings selected by the user of the electronic device 10, the processor core complex 18, image processing circuitry 28, or both the processor core complex 18 and the image processing circuitry 28 may modify image data, including an original image (or images) originally presented in the image window 142 or any other content (e.g., images, video, user interfaces) shown after the user input provided at process block 164, based on the color settings indicated by user input. For instance, color(s) in an image provided in the image window 142 may be modified in response to the user input. More specifically, as a user causes a slider 144 to be moved, the processor core complex 18, image processing circuitry 28, or both the processor core complex 18 and the image processing circuitry 28 may determine adjusted image data (e.g., new RGB or color values for one or more pixels of the electronic display 12) based on the user input to move the slider 144, and the adjusted image data may be displayed. As such, the user may view see how moving a particular slider 144 causes image content to be modified and allow the user to find color settings (which correspond to the placements of the sliders 144) that best suit the user.

While modification of image data is discussed in more detail below, the sliders 144 themselves will first be described. Referring briefly back to FIG. 11, adjusting the threshold slider (e.g., first slider 144A) causes colors of a region 52 to be modified to be closer to a boundary of the region. For instance, moving the threshold slider for the yellow-green region (i.e., region 52B) to one side (e.g., to the left) may cause an original hue to have more yellow, while moving the slider to the other side (e.g., to the right) may cause the original hue to be transformed to a hue that includes more green. More specifically, the positioning of the first slider 144A may adjust where a threshold within the region 52B is such that hues falling one side of the threshold are modified to have more of one color (e.g., in the current example, yellow or green) depending on which side of the threshold the hue is located. Furthermore, adjusting the threshold slider may also cause the secondary component (e.g., the medium color component) for colors of a region 52 to be increased. As an example, if the first slider 144A for the cyan-blue region (e.g., region 52D) is placed relatively close to blue (e.g., to the left), the green component of the cyan-blue region may be enhanced within the region 52D so that blue-green is relatively more differentiable from blue-red or purple compared to the original image data.

Figure 13:
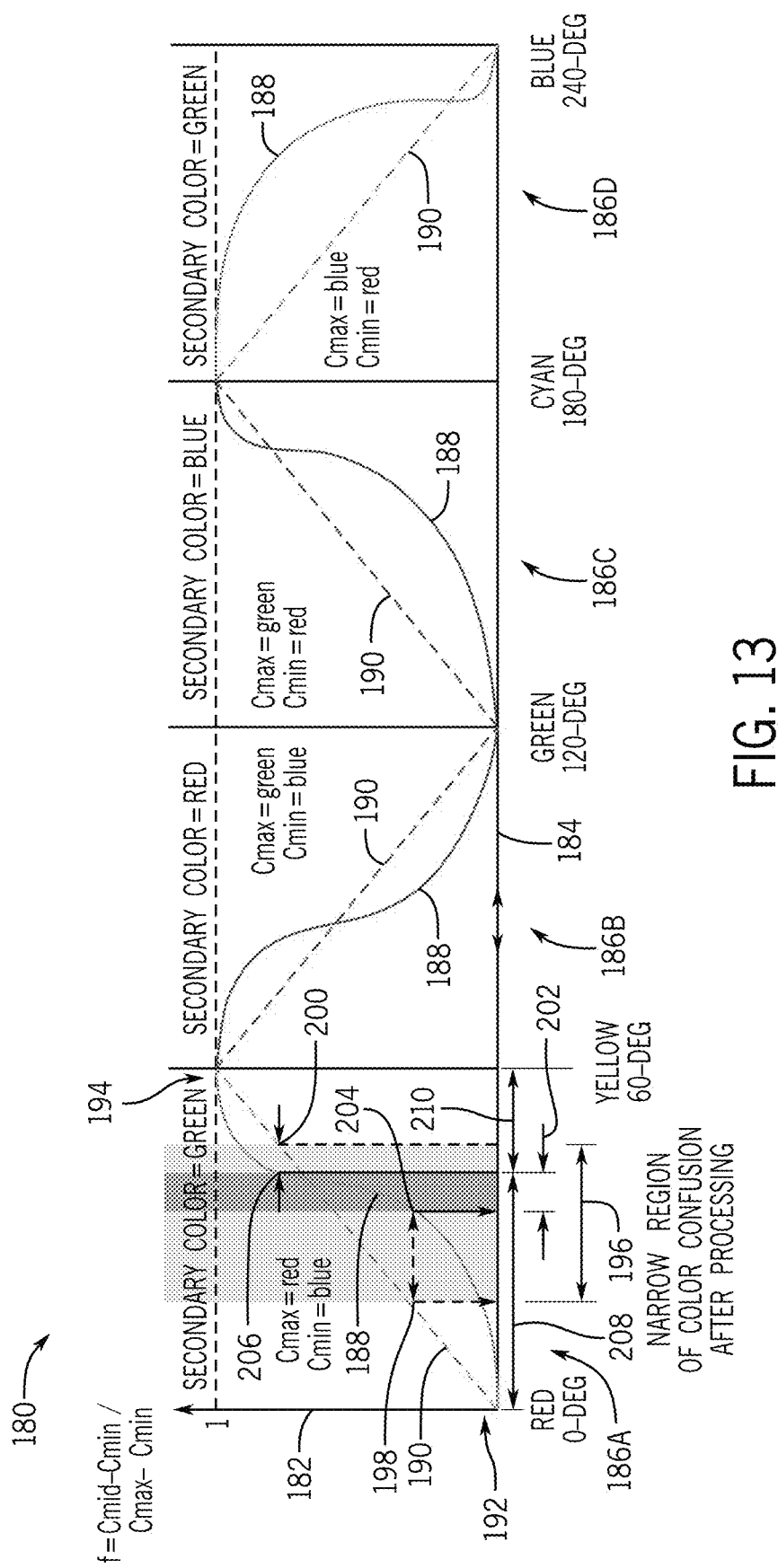
FIG. 13 is a graph of the value of a function for adjusted image data, the function being defined as a quotient of a first difference of a middle color component and a minimum color component divided by a second difference of a maximum color component and the minimum color component, in accordance with an embodiment.

Bearing this in mind, FIG. 13 is a graph 180A of the value of a function $f$ (indicated by axis 182) across color sectors (indicated by axis 184), which includes sections 54 of the color wheel 50. For example, the axis 184 includes areas 186A-186D corresponding to regions 52A-52D of the color wheel 50. The function $f$ itself is indicated by line 188, which is indicative of the color (e.g., for a particular pixel) as modified by the processor core complex 18, image processing circuitry 28, or combination of the processor core complex 18 and the image processing circuitry 28 (e.g., as performed at process block 166 of the process 160 of FIG. 12.) In particular, $f$ is defined as:

$$f = \frac{C_{mid} - C_{min}}{C_{max} - C_{min}} \quad \text{Equation 1}$$

where $C_{max}$ is the value of the maximum color component, $C_{mid}$ is the value of the middle color component (which is also indicated as "secondary color" within each area 186 of the graph 180A), and $C_{min}$ is the value of minimum color component. The maximum, middle, and minimum colors for each area 186 of the graph 180A are indicated below in Table 1. Table 1 also indicates the maximum, middle, and minimum color components associated with regions 52E, 52F.

The graph 180A also includes line 190, which is indicative of unmodified color values. In other words, the line 190 is indicative of the value of θ for image data that is not modified using the techniques of the present disclosure (e.g., original image data). For example, at a minimum point 192 of the area 186A corresponding to the color red (e.g., RGB value 255, 0, 0), $f$ has a value of zero due to $C_{mid}$ being zero. At a maximum point 194 corresponding to yellow (e.g., RGB value 255, 255, 0) that forms the boundary between the areas 186A, 186B, $f$ has a value of one because $C_{mid}$ and $C_{max}$ are equal. Accordingly, as the line 190 transitions from the minimum point 192 to the maximum point 194 within the area 186A, the amount of the secondary color (i.e., green, which is associated with $C_{mid}$) increases.

For users with color vision deficiency, increasing the amount of a secondary color (to an extent and depending on the specific user) may result in a zone of confusion. More specifically, as the amount of the secondary color increases until a certain point (which may vary from user to user) at which $f$ reaches a value relatively closer to one, a viewer may not be able to discern between colors. For example, area 196 of the graph 180A is representative of a zone of confusion a user may experience when viewing unmodified content. In other words, for a certain range of values of the function $f$, a user may experience difficulty discerning between colors. For instance, at point 198 on the line 190 (which is one boundary of the zone of confusion represented by the area 196), the value of θ may be a first value. At point 200 on the line 190, which represents another boundary of the zone of confusion represented by the area 196, the value of θ may be a second value.

By modifying the amount of the secondary color present, the zone of confusion may be reduced relative to using unmodified image data. For example, as represented by area 202 associated with the line 188, when image data is modified using the techniques of the present disclosure, the zone of the confusion may be reduced relative to when unmodified image data is used. In particular, point 204, which corresponds to point 198 (e.g., has a same value of $f$), is positioned further right along the axis 184 (relative to point 198), and point 206, which corresponds to point 200, is positioned further left along the axis 184 (relative to point 200), signifying that colors (e.g., as indicated by original (i.e., unmodified) image data) may be modified to include less of the secondary color or more of the secondary color depending on the location within an area 186 (corresponding to a region 52 of the color wheel 50) a point on the line 188 is. For example, for colors having relatively less of the secondary color (e.g., green, in region 52A and area 186A), unmodified image data may be modified to use less of the secondary color (e.g., green in area 186A) in area 208, while colors that have more of the secondary color present (e.g., colors in area 210) may be modified to include more of the

TABLE 1

| Area 186 in graph 180A | Corresponding region 52 in color wheel 50 | Name of region 52 | Maximum color component | Middle color component | Minimum color component |
|---|---|---|---|---|---|
| 186A | 52A | Red-yellow | Red | Green | Blue |
| 186B | 52B | Yellow-green | Green | Red | Blue |
| 186C | 52C | Green-cyan | Green | Blue | Red |
| 186D | 52D | Cyan-blue | Blue | Green | Red |
| n/a | 52E | Blue-violet | Blue | Red | Green |
| n/a | 52F | Violet-red | Red | Blue | Green | secondary color. As such, modified colors may resemble colors called for by original image data while also being discernable to users with color vision deficiency.

Figure 14:
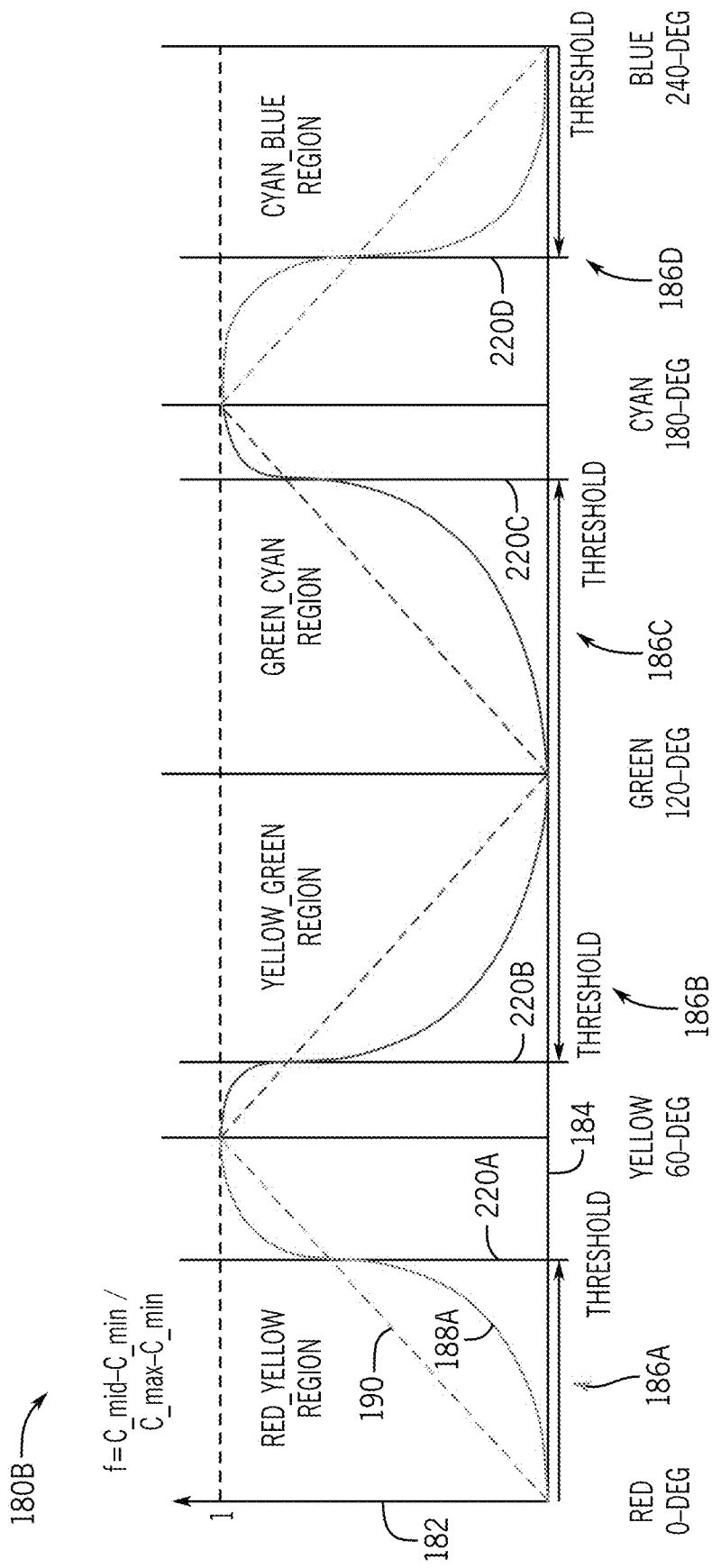
FIG. 14 is a graph indicative of adjusted image data that has been generated in a different manner than the adjusted image data of FIG. 13, in accordance with an embodiment.

To help provide more context regarding the threshold slider, FIG. 14 is provided. In particular, FIG. 14 is graph 180B that includes the axes 182, 184, lines 190, and a line 188A. The line 188A is similar to the line 188 of FIG. 13 in that the line 188A is representative of values of $f$ for adjusted image data. In other words, the line 188A is representative of values of $f$ that occur for adjusted image data, with the adjusted image data being adjusted in a different manner than the adjusted image data represented by line 188 of FIG. 13, for example, due to the sliders 144 having a different placement (than the placement that would result in adjusted image data represented by the line 188).

The graph 180B also includes lines 220 (e.g., lines 220A-220D), which are representative of where thresholds are positioned within the areas 186 (e.g., areas 186A-186D). That is, line 220A is representative of the placement of the threshold for area 186A (which corresponds to region 52A of the color wheel 50), line 220B is representative of the placement of the threshold for area 186B (which corresponds to region 52B of the color wheel 50), line 220C is representative of the placement of the threshold for area 186C (which corresponds to region 52C of the color wheel 50), and line 220D is representative of the placement of the threshold for area 186D (which corresponds to region 52D of the color wheel 50). Thresholds associated with the regions 52E, 52F may also be defined. Referring specifically to the line 220A, to one side of the line 188A (e.g., left of line 220A), the line 188A has a value of $\theta$ that is lower than the corresponding value of $\theta$ for the same value on the axis 184. Thus, for points along the line 188A that are to the left of the line 220A, the relative amount of the secondary color component (e.g., green) may be reduced relative to the line 190. Conversely, for points along the line 188A to the right of the line 220A, the relative amount of the second color component may be increased. As discussed above, by performing such adjustments when generating adjusted image content, users with color vision deficiency may be better able to discern between colors.

By utilizing the sliders 144 (e.g., one or more first sliders 144A), a user may adjust the placement of the lines 220. In turn, the processor core complex 18, image processing circuitry 28, or both may modify how adjusted image data is generated. For example, if a user were to adjust a threshold slider (e.g., first slider 144A) for the region 52, the placement of the line 220A would have a corresponding adjustment, and the line 188A would also be modified. For instance, if the slider 144A were moved to increase the amount of red color present, the line 220A may be moved to the right so that more colors within the region 52A are represented with more red (and less green). Additionally, the line 188A would be adjusted so that a larger range of values along the axis 184 within the area 186A on the line 188A would have values of $\theta$ that are lower than the corresponding values of $\theta$ along the line 190 at the same point on the axis 184.

Before continuing with the discussion of the sliders 144, it should be noted that the examples discussed above with respect to the region 52A and area 186A are non-exclusive and non-limiting examples. That is, the techniques described above, as well as those described below, with respect to one specific region 52A or area (e.g., area 186A) may be applied to each region 52 or area 186. In this manner, the techniques provided in the present disclosure may be applied on a region by region basis.

Returning briefly to FIG. 11, as noted above, the sliders 144 may include power sliders such as the second slider 144B. Adjusting the power slider may cause a power value (e.g., exponent value) to be modified, thereby causing how adjusted image data is generated to be modified. In other words, when a user adjusts the position of a power slider, one or more exponent values associated with a region 52 of the color wheel may be modified. Consequently, processing circuitry that generates the adjusted image data (e.g., the processor core complex 18, image processing circuitry 28, or both) may determine different adjusted image data using a one or more modified power values based on a user inputs with one or more power sliders.

Figure 15:
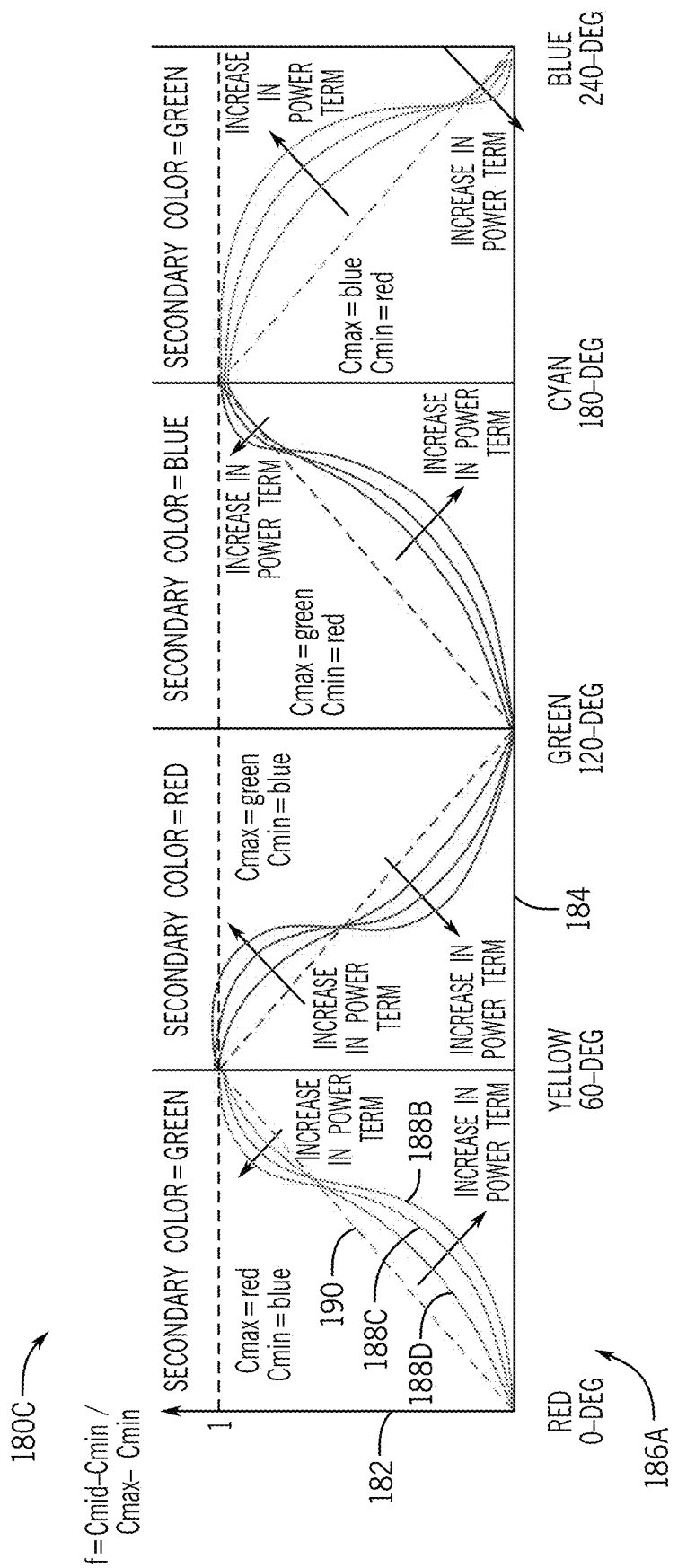
FIG. 15 is a graph showing how changes to power terms alter adjusted image data, in accordance with an embodiment.

To help demonstrate, FIG. 15 is provided. In particular, FIG. 15 is a graph 180C that includes the axes 182, 184 and the line 190. The graph 180C also includes lines 188B, 188C, 188D, which are representative of values of $\theta$ for three different sets of adjusted image data that may be generated based on three different positions of the respective power sliders for the regions 52A-52D. As the power slider is adjusted (e.g., by a user input) to increase or decrease the power value (which may or may not be displayed), the adjusted image content may be modified, which is represented by the lines 188B-188D. For example, line 188C represents a decrease in the power value from line 188B, and line 188D represents a decrease in the power values from line 188C.

Each region 52 (and, thus, each area 186) may have one or more associated power values. Thus, similar to how the portions of the line 188A of each area 186 of the graph 180B may be associated with a region-specific threshold value, the portions of the lines 188B-D found in each area 186 of the graph 180C may be associated with a different power value. In other words, each region 52 may have a power value that is selected by a user using a power slider (of the sliders 144) for the region 52, and the adjusted image data may be determined in a region-specific manner.

Returning briefly to FIG. 11, as also noted above, the sliders 144 may include sliders 144 may also include minimum color (c_min) sliders, such as the third slider 144C. For example, there may be three minimum color sliders: one for red; one for green; and one for blue. As noted above in Table 1, blue is the minimum color for regions 52A, 52B, red is the minimum color for regions 52C, 52D, and green is the minimum color for regions 52E, 52F. As also noted above, one potential way to increase discernibility between zones of confusion is to increase the saturation of colors within a region 52. To increase the saturation of colors, the minimum color component may be modified, for instance, as indicated by a user input made using the minimum color sliders.

Figure 16:
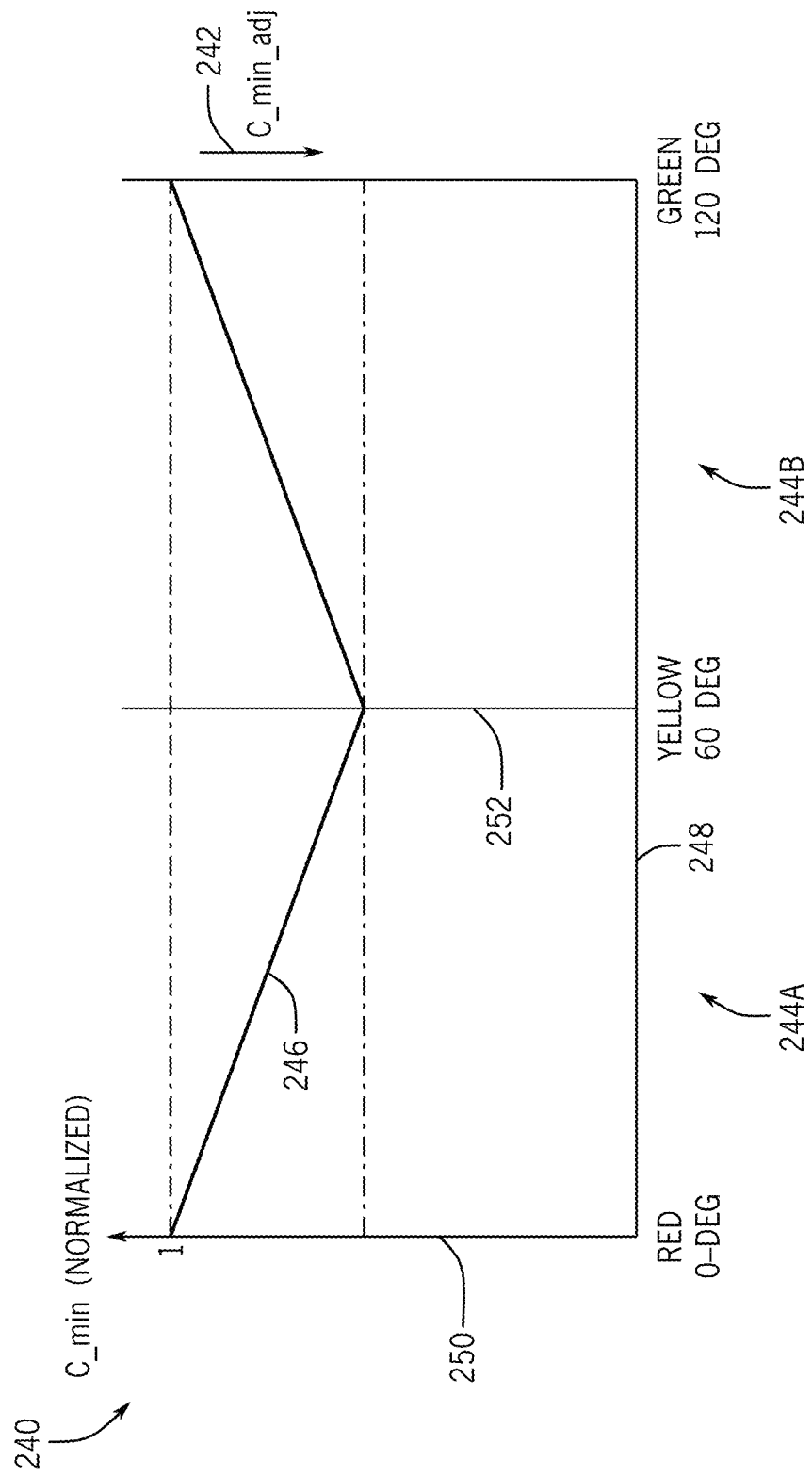
FIG. 16 is a graph illustrating a minimum color adjustment, in accordance with an embodiment.

Bearing this in mind, FIG. 16 is a graph 240 illustrating a minimum color adjustment (represented by arrow 242) for the color blue, which, as discussed above, is the minimum color in regions 52A, 52B. Area 244A and area 244B of the graph 240 respectively correspond to area 52A and area 52B of the color wheel 50. The graph 240 also includes line 246, axis 248 that is indicative of color within regions 52A, 52B, and axis 250. The axis 250 is indicative of the amount of the minimum color in adjusted image data. For example, the closer to line 252 the line 246 is, the more reduced the minimum color component (e.g., blue) is. By adjusting the position of the minimum color slider, the amount of the minimum color is modified in the adjusted image content, and the slope of the line 246 changes. For example, if a user were to adjust the minimum color slider to a minimum position, the line 246 would be horizontal (e.g., constantly at a value of one on the axis 250), and no additional (as desired by a user) adjustment to minimum color would occur. However, moving the minimum color slider to a maximum position, the amount of the minimum color present would be decreased, and the line 246 would be steeper. Accordingly, users may adjust the minimum color component for each color (e.g., red, green, and blue) using a respective minimum color slider, and processing circuitry (e.g., processor core complex 18, image processing circuitry 28, or both) may generate adjusted image data based on the respective position of each slider. In this manner, the electronic device 10 may generate adjusted image data that, when displayed (e.g., via the electronic display 12) better enables the user to discern between colors.

Figure 17:
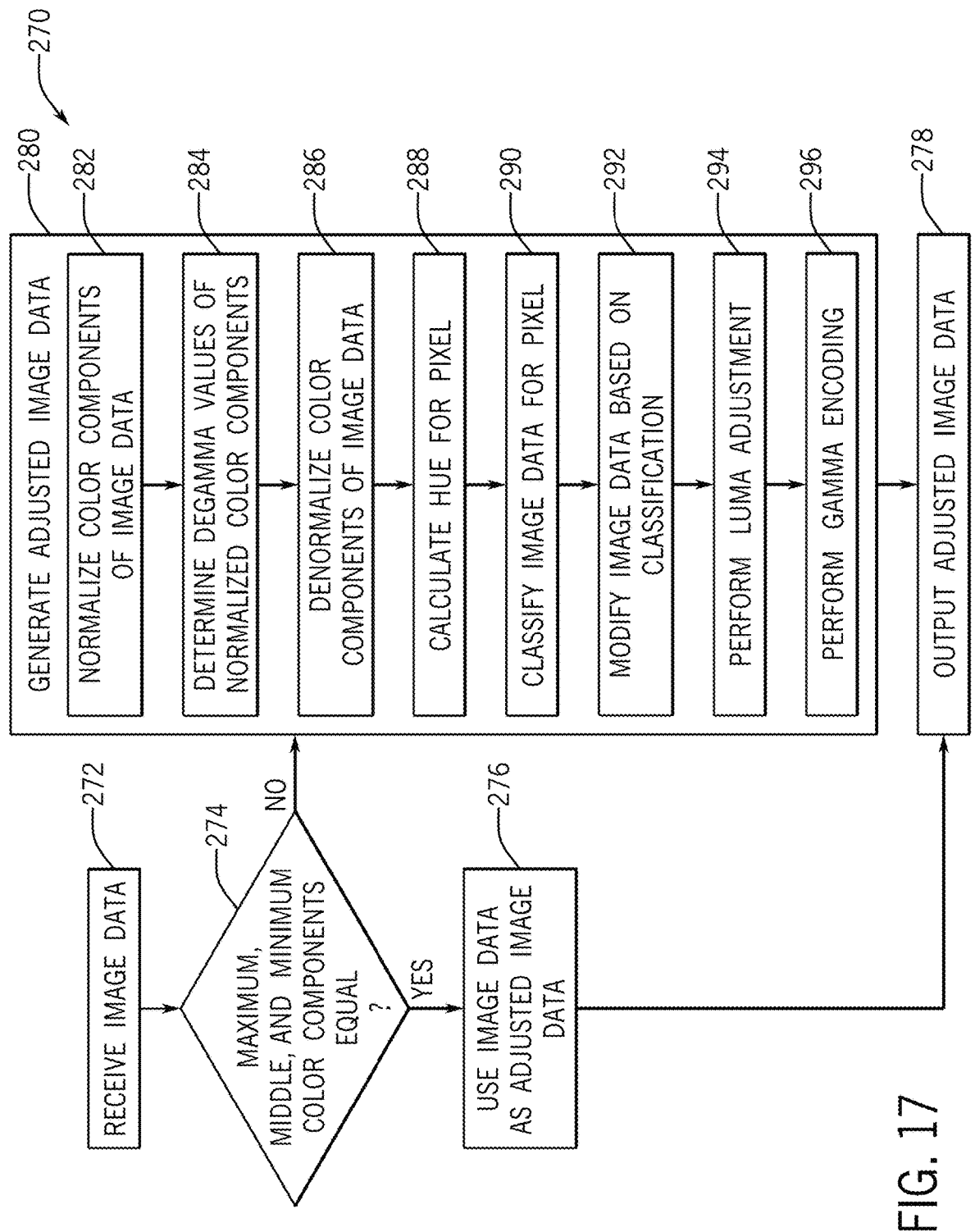
FIG. 17 is a flow diagram of a process for generating adjusted image data, in accordance with an embodiment.

Keeping the foregoing in mind, FIG. 17 is a flow diagram of a process 270 for generating adjusted image data. The process 270 may be performed as process block 166, portions of the process 270 may be performed as process block 166, or the process 270 may be performed as part of process block 166 of the process 160 discussed above with respect to FIG. 12. In some embodiments, the process 270 may be implemented at least in part based on circuit connections formed (e.g., programmed) in the processor core complex 18, the image processing circuitry 28, or both (e.g., partially or completely) the processor core complex 18 and the image processing circuitry 28. Additionally or alternatively, the process 270 may be implemented at least in part by executing instructions stored in a tangible non-transitory computer-readable medium, such as the local memory 20, using processing circuitry, such as the processor core complex 18, image processing circuitry 28, or both the processor core complex 18 and the image processing circuitry 28. The process 270 generally includes receiving image data (process block 272), determining whether the maximum, middle, and minimum color components of image data for a pixel are equal (decision block 274), and, when the maximum, middle, and minimum color components of image data are equal, using the received image data as adjusted image data (process block 276) and outputting the adjusted image data (process block 278). When the maximum, middle, and minimum color components of image data are not equal, the process 270 includes generating adjusted image data (process block 280) and outputting the adjusted image data (process block 278). Generating adjusted image data may be performed through a series of operations. For example, adjusted image may be generated by normalizing color components of image data, such as original or source image data (sub-process block 282), determining degamma values for the normalized color components (sub-process block 284), denormalizing color components of the image data (sub-process block 286), calculating hue for a pixel (sub-process block 288), classifying image data for a pixel (sub-process block 290), modifying image data for the pixel based on the classification of the image data (sub-process block 292), performing a luma adjustment (sub-process block 294), and performing gamma adjustment (sub-process block 296). It should also be noted that, in some embodiments, the process 270 may include fewer operations than those described below. As such, the process 270 may be performed using only a portion of the operations provided in FIG. 17.

At process block 272, the processor core complex 18, image processing circuitry 28, or both the processor core complex 18 and the image processing circuitry 28 may receive image data. For example, the image data may be considered as source image data or original image data that will be modified during performance of the process 270. The source image data may be generated by the electronic device 10 (e.g., via image sensor 13 or from memory 20 or main memory storage device 22) or received by the electronic device 10 (e.g., via I/O ports 16 or network interface 24).

At decision block 274, the processor core complex 18, image processing circuitry 28, or both the processor core complex 18 and the image processing circuitry 28 may determine whether the maximum, middle, and minimum color components of image data for pixels (e.g., for each pixel for which there is image data) are equal. For instance, as discussed above, image data for a pixel may include red, green, and blue components (e.g., RGB values), one of which is the maximum color component of the pixel, another of which is the middle color component of the pixel, and yet another of which is the minimum color component of the pixel. Accordingly, at decision block 274, the processor core complex 18, image processing circuitry 28, or both the processor core complex 18 and the image processing circuitry 28 may determine whether the color components for a pixel are equal, and such a determination may be made for each pixel for which there is image data. It should be noted that, in another embodiment, rather than determining whether the maximum, middle, and minimum color components of the image data for pixels are equal, decision block 274 may be performed by determining whether the middle and minimum color components are equal.

If it is determined that the maximum, middle, and minimum color components are equal, at process block 276, the processor core complex 18, image processing circuitry 28, or both the processor core complex 18 and the image processing circuitry 28 may utilize the received image data as adjusted image data. In other words, when the color components for a pixel are equivalent, the image data (as received at process block 272) may be unmodified but used as adjusted image data. Furthermore, at process block 278, the processor core complex 18, image processing circuitry 28, or both the processor core complex 18 and the image processing circuitry 28 may output the adjusted image data. Thus, when for image data for pixels in which the color components are equivalent, the adjusted image data that is output may be the image data that is received at process block 272.

Figure 18:
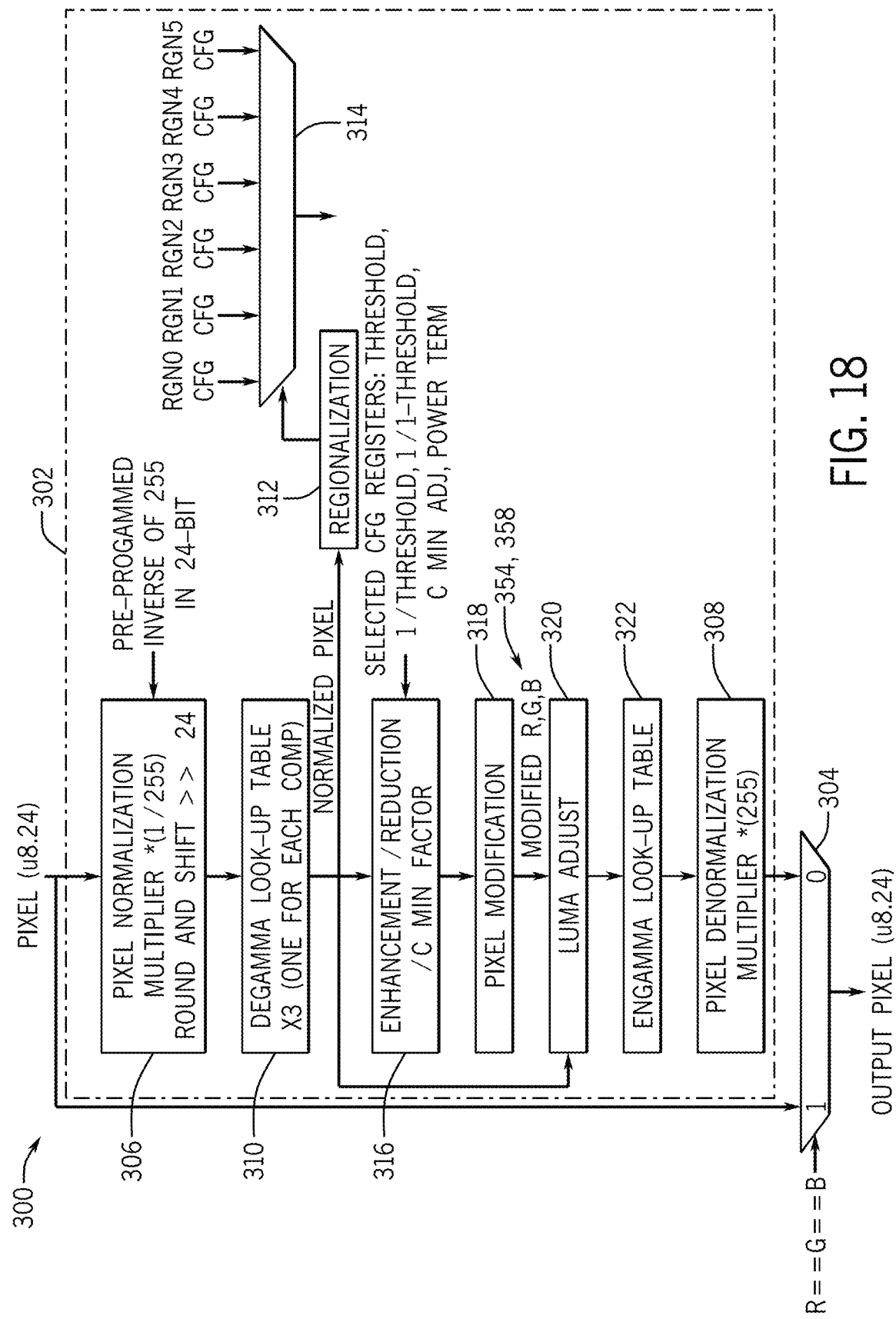
FIG. 18 is a block diagram of image data processing circuitry that may be included in one or both of the processor core complex and the image processing circuitry of FIG. 1, in accordance with an embodiment.

Keeping this in mind, FIG. 18 is a block diagram of image data processing circuitry 300 that may be utilized to generate adjusted image data. Accordingly, the image data processing circuitry 300 may be utilized to perform the process 270. The image data processing circuitry 300 may be included entirely or partially in the processor core complex 18, image processing circuitry 28, or both the processor core complex 18 and the image processing circuitry 28. For instance, in some embodiments, one of the processor core complex 18 and the image processing circuitry 28 may include the image data processing circuitry. In other embodiments, the processor core complex 18 and the image processing circuitry 28 may each include the image data processing circuitry. In further embodiments, the processor core complex 18 and the image processing circuitry 28 may each include portions of the image data processing circuitry 300. Furthermore, while elements of the image data processing circuitry 300 are described as circuitry, it should be noted that one or more components of the image data processing circuitry 300 may be implemented as computer-readable instructions that are executed by the processor core complex 18, image processing circuitry 28, or both the processor core complex 18 and the image processing circuitry 28.

The image data processing circuitry 300 includes image data modification circuitry 302 that, as discussed below, may be utilized to generate adjusted image data. The image data processing circuitry 300 also includes a multiplexer 304 that may receive original image data (e.g., image data received at process block 272) and image data generated by the image data modification circuitry 302. The multiplexer 304 may also receive an input indicative of whether the color components are equal (as indicated by "R==G==B") and output either the original image data or image data generated by the image data modification circuitry 302 based on the input. More specifically, when the input is indicative of the color components being equal, the output of the multiplexer 304 is the original image data, and when the input is not indicative of the color components being equal, the output of the multiplexer 304 is a the adjusted image data that is generated by the image data modification circuitry 302. Accordingly, in instances in which the color components of a pixel are equal, the image data processing circuitry 300 may output adjusted image data for the pixel that is equivalent to the image data received by the image data processing circuitry 300.

Returning to FIG. 17, if at decision block 274 it is determined that the maximum, middle, and minimum color components are not equal, at process block 280, the processor core complex 18, image processing circuitry 28, or both the processor core complex 18 and the image processing circuitry 28 may generate adjusted image data. In other words, when at least one color component is different than another color component, adjusted image data that enables a user with color vision deficiency to better discern colors or hues in image content may be generated. As discussed below with respect to sub-process blocks 282, 284, 286, 288, 290, 292, 294, 296, generating the adjusted image data may include several operations.

At sub-process block 282, the processor core complex 18, image processing circuitry 28, or both the processor core complex 18 and the image processing circuitry 28 may normalize the color components of image data received at process block 272 (e.g., original or source image data). For example, color components for each pixel in the electronic display 12 may be values that may be defined according to one or more scales (e.g., using a range of values from zero to 255 scale or a different scale), and the image data may be normalized so that each value is defined on a different, normalized scale (e.g., a value from zero to one, inclusive).

Keeping this in mind, and referring to FIG. 18, the image data processing circuitry 300 includes a normalization block 306 that may perform the normalization operation associated with sub-process block 282. For example, the normalization block 306 may include multiplier circuitry that can perform multiplication and shift (e.g., left-shift or right-shift) operations on the color components of image data for each pixel (e.g., in a frame of image content) to generate normalized image data.

Returning to FIG. 17, at sub-process block 284, the processor core complex 18, image processing circuitry 28, or both the processor core complex 18 and the image processing circuitry 28 may determine degamma values for the normalized color components generated at sub-process block 282. Gamma correction can be used to control the overall brightness of an image. For example, gamma may define the relationship between a pixel's numerical value and its actual luminance. Thus, the processor core complex 18, image processing circuitry 28, or both the processor core complex 18 and the image processing circuitry 28 may determine values that remove gamma correction that may have previously been applied to image data to determine degamma values. The degamma values may include values for each component of the image data for each pixel. For instance, for a given pixel, there may be red, green, and blue degamma values.

Turning briefly to FIG. 18, the image data processing circuitry 300 includes degamma circuitry 310, which may be implemented using a look-up table (e.g., alone or in combination with processing circuitry). For example, degamma circuitry 310 may receive normalized image data (which includes a red, green, and blue component). The look-up table may define a relationship between received values and output values such that for any given values of a component, a particular output value will be selected and output from the degamma circuitry 310. Thus, the degamma circuitry 310 may receive normalized image data and determine (using the look-up table) degamma values for each color component, and output the determined degamma values. In other words, the degamma circuitry 310 may generate degamma normalized color components. Furthermore, while the degamma circuitry 310 is described as being implemented partially using a look-up table, in other embodiments, other circuitry may be used.

Continuing with FIG. 17 and the process 270, at sub-process block 286, the processor core complex 18, image processing circuitry 28, or both the processor core complex 18 and the image processing circuitry 28 may denormalize color components of the image data. For example, the degamma values may be multiplied using pixel denormalization circuitry 308 of the image data processing circuitry 300. The pixel denormalization circuitry 308 may include multiplier circuitry that multiplies the degamma values by a particular value (e.g., 255) to generate values scaled to the same scale as the image data received at process block 272 of the process. Furthermore, it should be noted that, in some embodiments, denormalization of the color components performed at sub-process block 284 may be performed later during the operations included in process block 278. For example, in one embodiment, the operations associated with sub-process block 284 may be performed last among the operations associated with process block 278.

At sub-process block 288, the processor core complex 18, image processing circuitry 28, or both the processor core complex 18 and the image processing circuitry 28 may calculate hue for each pixel for which there is image data (e.g., as generated at sub-process block 284 or sub-process block 286). Here, hue may be defined by the red, green, and blue color components generated at one of sub-process blocks 282, 284, 286. Thus, hue may be a particular color that is defined as the red, green, and blue components. It should also be noted that, in some embodiments, the operations associated with sub-process block 288 may be skipped.

At sub-process block 290, image processing circuitry 28, or both the processor core complex 18 and the image processing circuitry 28 may classify image data for each pixel such that each pixel is classified into one of the regions 52 of the color wheel 50 based on the hue for the pixel. More specifically, classification may be performed based which colors form the maximum color (component), middle color (component), and minimum color (component) for the hue. For example, based on which color (e.g., among red, green, and blue) is the maximum color component, which color is the middle color component, and which color is the minimum color component, the pixel for each hue may be classified in accordance with Table 1. For instance, a hue that has a maximum color component of red, a middle color component of blue, and a minimum color component of green may be classified in region 52F.

In other embodiments, the pixel for each hue may be classified in accordance with Table 2 below. In Table 2, the letter "R" is used to refer to the red color component, "G" is used to refer to the green color component, and "B" is used to refer to the blue color component. Additionally, Table 2 includes two conditions for each region 52. When one of the conditions has been met, a hue for a pixel may be classified as belonging to the region 52 to which the met condition pertains. Furthermore, the conditions in Table 2 include "&," which is used to signify a logical AND. Thus, a condition is met when each element of the condition is satisfied. For example, the first condition for region 52A is met when: 1) the red component is greater than or equal to the green component; 2) the red component is greater than the blue component; and 3) the green component is greater than the blue component.

TABLE 2

| Condition 1 | Condition 2 | Region 52 | Name of region 52 |
|---|---|---|---|
| R ≥ G & R > B & G > B | R > G & R ≥ B & G > B | 52A | Red-yellow |
| R ≥ G & R > B & B > G | R > G & R ≥ B & B > G | 52B | Yellow-green |
| G ≥ R & G > B & R > B | G > R & G ≥ B & R > B | 52C | Green-cyan |
| G ≥ R & G > B & B > R | G > R & G ≥ B & B > G | 52D | Cyan-blue |
| B ≥ R & B > G & G > R | B > R & B ≥ G & G > R | 52E | Blue-violet |
| B ≥ R & B > G & R > G | B > R & B ≥ G & R > G | 52F | Violet-red |

Referring briefly to FIG. 18, the image data processing circuitry 300 may include regionalization circuitry 312 that receives image data (e.g., as generated at sub-process block 284, sub-process block 286, or sub-process block 288). The regionalization circuitry 312 may determine which the maximum, middle, and minimum color component for each pixel for which there is data and classify each pixel into one of the regions 52. As discussed below, image data may be modified based on the classification. In other words, image data may be modified in a region-specific manner as indicated by one or more user inputs indicative of a placement for one or more of the sliders 144.

Returning to FIG. 17, at sub-process block 292, image processing circuitry 28, or both the processor core complex 18 and the image processing circuitry 28 may modify image data for the pixel based on the classification of the image data. In particular, modified image data for a pixel may be generated by modifying the middle color component, minimum color component, or both the middle color component and minimum color component of the pixel (e.g., as provided in the image data received at process block 272). To help explain how modified image data may be generated, FIGS. 18-20 are referenced below.

Referring now to FIG. 18, the image data processing circuitry 300 includes a multiplexer 314 (e.g., a 6 to 1 multiplexer). The multiplexer 314 may receive regionalization configuration data for each of the regions 52 as well as an output of the regionalization circuitry 312 indicative the classification of which region 52 the hue for a pixel is in. The multiplexer 314 may then output the regionalization configuration settings associated with the region 52 indicated by the output of the regionalization circuitry 312. The regionalization configuration settings may be stored in the local memory 20 or other memory that may be included in the electronic device 10, such as, but not limited to, registers or cache memory of the processor core complex 18, image processing circuitry 28, image data processing circuitry 300, or any combination thereof. The regionalization configuration settings may include data or values that are used to determine modified image data. For instance, the value of the threshold for a region 52 (associated with the threshold slider for the region 52), the value of the power for the region 52 (associated with power slider for the region 52), and a minimum color adjustment value for the region 52 (associated with the c_min slider for the region 52) may be included in regionalization configuration settings. Furthermore, values derived from the value of the threshold, the value of the power, and the minimum color adjustment value, such as sums, differences, reciprocal values, products, or quotients (or values that utilized any combination thereof) may also be included in the regionalization configuration settings.

Figure 19A:
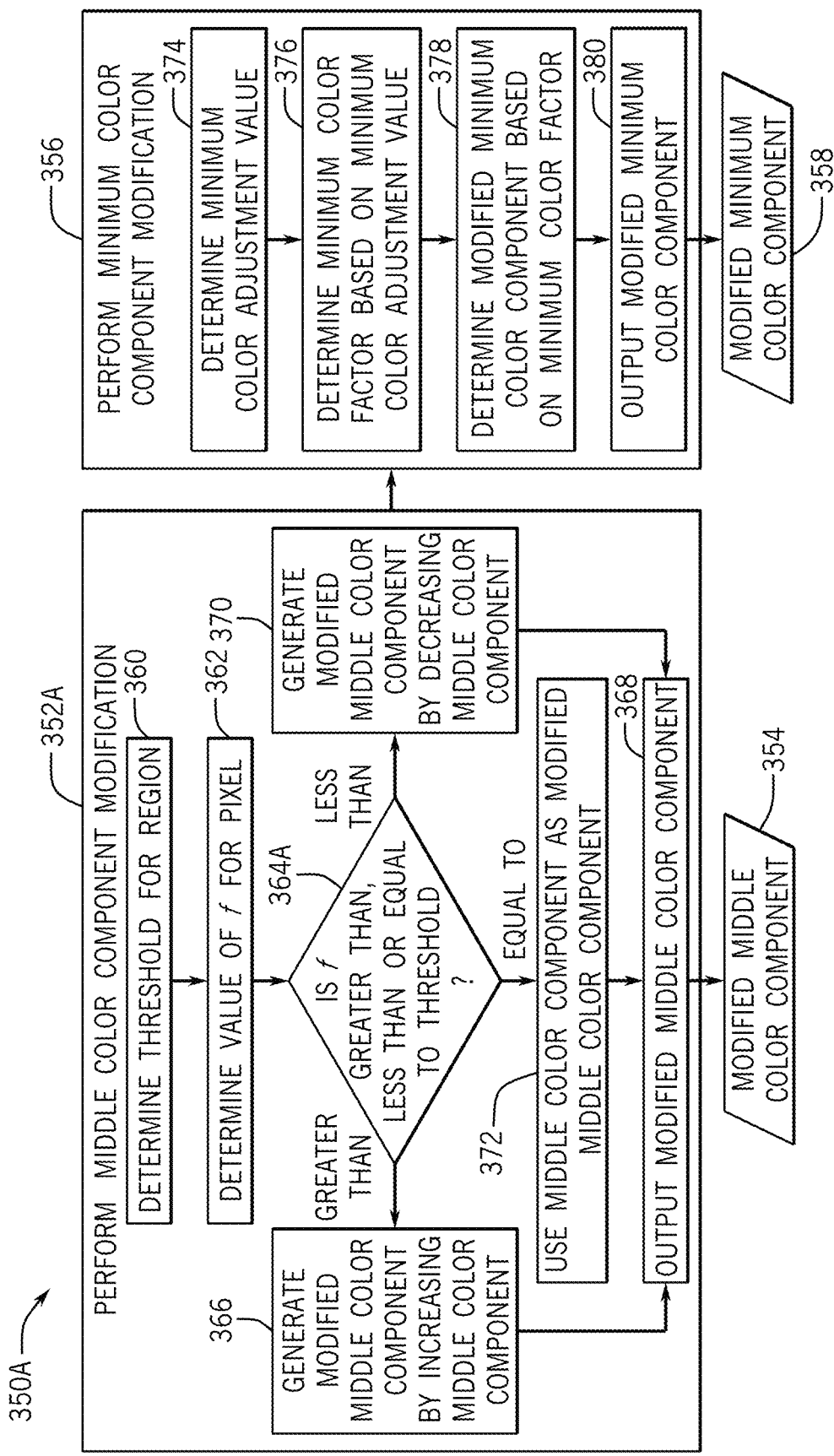
FIG. 19A is a flow diagram of a process for generating modified image data, in accordance with an embodiment.
Figure 20:
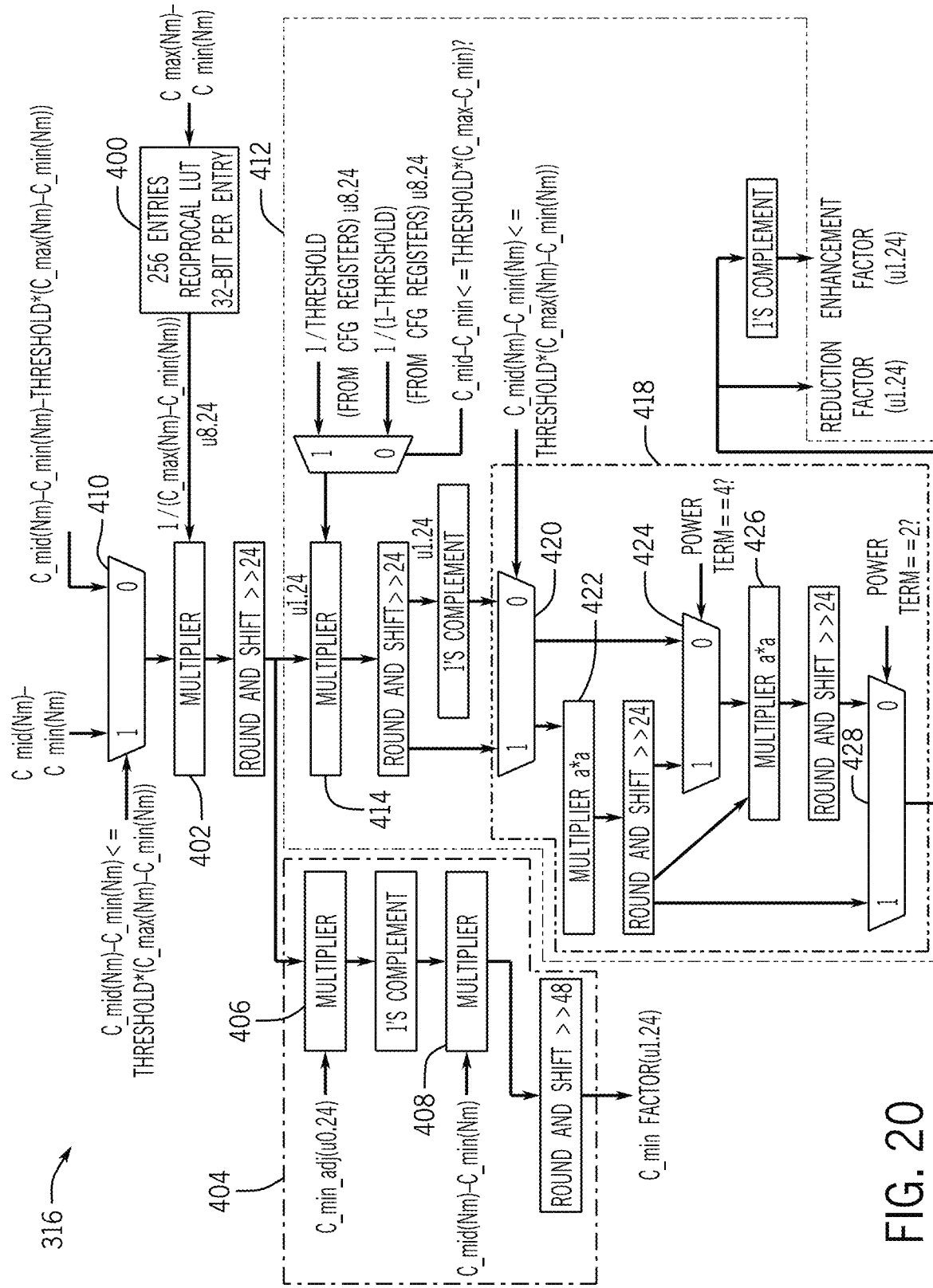
FIG. 20 is a block diagram of the regionalization setting determination circuitry of FIG. 18, in accordance with an embodiment.

Bearing this in mind, FIG. 19A is a flow diagram of a process 350A for generating modified image data. The process 350A may be performed as sub-process block 292 of the process 270, portions of the process 350A may be performed as sub-process block 292, or the process 350A may be performed as part of sub-process block 292 of the process 270 discussed above with respect to FIG. 17. The process 350A may be performed for each pixel of image data that is to be modified (e.g., as determined as decision block 274 of process 270). The process 350A may also be performed on a region-wide basis, meaning the process 350A may be performed for each region 52 of the color wheel 50 for which there is image data to be modified. In some embodiments, the process 350A may be implemented at least in part based on circuit connections formed (e.g., programmed) in the processor core complex 18, the image processing circuitry 28, or both (e.g., partially or completely) the processor core complex 18 and the image processing circuitry 28. The process 350A may also be implemented using image data processing circuitry 300 as well as the circuitry discussed below with respect to FIG. 20. Additionally or alternatively, the process 350A may be implemented at least in part by executing instructions stored in a tangible non-transitory computer-readable medium, such as the local memory 20, using processing circuitry, such as the processor core complex 18, image processing circuitry 28, or both the processor core complex 18 and the image processing circuitry 28.

The process 350A generally includes performing a middle color component modification (process block 352A) to generate a modified middle color component 354 and performing a minimum color component modification (process block 356) to generate a modified minimum color component 358. Performing middle color component modification (process block 352A) may include determining a threshold for a region 52 (sub-process block 360), determining a value of the function $f$ for a pixel (sub-process block 362), and determining whether the value of the function $f$ is greater than, less than, or equal to the threshold (sub-decision block 364A). When the value of the function $f$ is greater than the threshold, performing a middle color component modification includes generating a modified middle color component by increasing the middle color component (sub-process block 366) and outputting the modified middle color component (sub-process block 368). When the value of the function $f$ is greater than the threshold, performing a middle color component modification includes generating a modified middle color component by increasing the middle color component (sub-process block 366) and outputting the modified middle color component (sub-process block 368). When the value of the function $f$ is less than the threshold, performing a middle color component modification includes generating a modified middle color component by decreasing the middle color component (sub-process block 370) and outputting the modified middle color component (sub-process block 368). When the value of the function $f$ is equal to the threshold, performing a middle color component modification includes using the middle color component (e.g., as received) as the modified middle color component (sub-process block 372) and outputting the modified middle color component (sub-process block 368). Furthermore, performing minimum color component modification (process block 356) may include determining a minimum color adjustment value for a region (sub-process block 374), determining a minimum color factor based on the minimum color adjustment value (sub-process block 376), determining a modified minimum color component based on the minimum color factor (sub-process block 378), and outputting the modified minimum color component (sub-process block 380).

At process block 352A, the processor core complex 18, the image processing circuitry 28, or both the processor core complex 18 and the image processing circuitry 28 may perform a middle color component modification on received image data (e.g., as received at process block 272 of the process 270). Middle color component modification may be performed on a region-specific basis, meaning middle color component modification may occur based on into which of the regions 52 the hue of a pixel has been classified. As noted above, middle color component modification may be performed using several operations, such as those described below with respect to sub-process blocks 360, 362, sub-decision block 364A, and sub-process blocks 366, 368, 370, 372.

At sub-process block 360, the processor core complex 18, the image processing circuitry 28, or both the processor core complex 18 and the image processing circuitry 28 may determine a threshold for a region 52, such as the region 52 determined by the regionalization circuitry 312. Referring to FIG. 18, as discussed above, the multiplexer 314 may output regional configuration settings for the region 52 indicated by the regionalization circuitry, and the regionalization configuration settings may include the value of the threshold for a region 52, the value of the power for the region 52, and the minimum color adjustment value for the region 52. Thus, at sub-process block 360, the image data modification circuitry 302 may determine the threshold (as well as the power value and minimum color adjustment value) for the region 52, for example, by reading such values from the local memory 20 or one or more registers that store the values.

The values of the threshold, power, and minimum color adjustment for each region 52 may have default values, which are provided below in Table 3. However, as noted above, the threshold, power, and minimum color adjustment for each region 52 is modifiable by the user by interacting with one or more of the sliders 144. For example, as a user modifies the position a slider 144 for the threshold associated with region 52A (e.g., a threshold slider), the value of the threshold for the region 52A may be modified based on the user's interaction with the slider 144. The modified value of the threshold, as opposed to the default value, would be utilized when performing sub-process block 360 if the value of the threshold has been modified. The default values may be provided in Table 3 could therefore be using for values that have not been modified. Before discussing additional regionalization configuration settings, it should be noted that in one embodiment, the value for each threshold may range from zero to one (inclusive), the value for each power may be an integer ranging from two to four (inclusive), and the value for the minimum color adjustment may range from zero to one (inclusive). In other embodiments, the ranges of values for the value of the respective thresholds of the regions 52, the ranges of values of each power, and the ranges of the value of the minimum color adjustment may differ. For example, the value of the power for a region 52 may range from one to an integer that is greater than four (inclusive), such as eight.

TABLE 3

| Region 52 | Name of region 52 | Value of Threshold | Power Value | Value of minimum color component adjustment |
|---|---|---|---|---|
| 52A | Red-yellow | 0.90 | 3 | 0.4 |
| 52B | Yellow-green | 0.90 | 3 | 0.4 |
| 52C | Green-cyan | 0.90 | 2 | 0.3 |
| 52D | Cyan-blue | 0.70 | 2 | 0.3 |
| 52E | Blue-violet | 0.02 | 3 | 0.0 |
| 52F | Violet-red | 0.20 | 2 | 0.0 |

As noted above, the regionalization configuration settings may also include values that are derived using the threshold, power, and minimum color adjustment values. In one embodiment, such values may also be determined at sub-process block 360. In another embodiment, such values are predetermined. In either case, such derived values may include an enhancement factor, a reduction factor, and a minimum color adjustment factor. Regionalization setting determination circuitry 316, which may be included for each region 52, may determine the enhancement factor, the reduction factor, and the minimum color adjustment factor for the regions 52. The regionalization setting determination circuitry 316 as well as determination of the enhancement factor, reduction factor, and minimum color adjustment factor are discussed below with respect to sub-process block 376 of the process 350A as well as FIG. 20.

Returning to FIG. 19A and the discussion of the process 350A, at sub-process block 362, the processor core complex 18, the image processing circuitry 28, or both the processor core complex 18 and the image processing circuitry 28 may determine a value of the function $f$ for a pixel (e.g., the pixel for which the modified middle color component 354 is to be generated). As described above, such a value may be determined using Equation 1, in which $f$ is equal to the difference of the values of the medium color component and minimum color component divided by the difference of the values of the maximum color component and the minimum color component.

At sub-decision block 364A, the processor core complex 18, the image processing circuitry 28, or both the processor core complex 18 and the image processing circuitry 28 may determine whether the value of the function $f$ is greater than, less than, or equal to the threshold. Referring briefly to FIG. 18, the image data processing circuitry 300 may include pixel modification circuitry 318, which may include adders, multipliers, and other circuitry that can perform mathematical operations on values such as the color components (maximum, middle, and minimum color components) as well as the values of the regionalization configuration settings. The pixel modification circuitry 318 may also perform the comparison performed at sub-process block 364A.

Returning to FIG. 19A, when the value of the function $f$ is determined to be greater than the threshold, at sub-process block 366, the processor core complex 18, the image processing circuitry 28, or both the processor core complex 18 and the image processing circuitry 28 may generate a modified middle color component by increasing the value of the middle color component. More specifically, the pixel modification circuitry 318 may modify the middle color according to Equation 2 provided below:

$$C_{mid,modified}=C_{min}+(C_{max}-C_{min})\times T+(1-T)(C_{max}-C_{min})(1-F_{enhance}) \quad \text{Equation 2}$$

where $C_{mid,modified}$ is the modified middle color component 354, $C_{min}$ is the minimum color component (e.g., as received at process block 272 of the process 270), $C_{max}$ is the maximum color component (e.g., as received at process block 272 of the process 270), T is the value of the threshold for the region 52, and $F_{enhance}$ is the value of the enhancement factor for the region. The enhancement factor, which may be determined by the regionalization setting determination circuitry 316, may be determined as provided below in Equation 3:

$$F_{enhance} = \left(1 - \left(\frac{(C_{mid} - C_{min}) - T \times (C_{max} - C_{min})}{(1 - T)(C_{max} - C_{min})}\right)\right)^P \quad \text{Equation 3}$$

where $C_{mid}$ is the middle color component (e.g., as received at process block 272 of the process 270) and P is the value of the power for the region 52.

At sub-process block 368, the processor core complex 18, the image processing circuitry 28, or both the processor core complex 18 and the image processing circuitry 28 may output the modified middle color component 354 generated at sub-process block 366.

However, when the value of the function $f$ is determined to be less than the threshold, at sub-process block 370, the processor core complex 18, the image processing circuitry 28, or both the processor core complex 18 and the image processing circuitry 28 may generate a modified middle color component by decreasing the value of the middle color component. More specifically, the pixel modification circuitry 318 may modify the middle color according to Equation 4 provided below:

$$C_{mid,modified}=C_{min}+(C_{max}-C_{min})\times T\times F_{reduce} \quad \text{Equation 4}$$

where $C_{mid,modified}$ is the modified middle color component 354, $C_{min}$ is the minimum color component (e.g., as received at process block 272 of the process 270), $C_{max}$ is the maximum color component (e.g., as received at process block 272 of the process 270), T is the value of the threshold for the region 52, and $F_{reduce}$ is the value of the reduction factor for the region 52. The reduction factor, which may be determined by the regionalization setting determination circuitry 316, may be determined as provided below in Equation 5:

$$F_{reduce} = \left(\frac{C_{mid} - C_{min}}{(C_{max} - C_{min}) \times T}\right)^P \quad \text{Equation 5}$$

where $C_{mid}$ is the middle color component (e.g., as received at process block 272 of the process 270) and P is the value of the power for the region 52.

At sub-process block 368, the processor core complex 18, the image processing circuitry 28, or both the processor core complex 18 and the image processing circuitry 28 may output the modified middle color component 354 generated at sub-process block 370.

Furthermore, when the value of the function $f$ is determined to be equal to the threshold, at sub-process block 370, the processor core complex 18, the image processing circuitry 28, or both the processor core complex 18 and the image processing circuitry 28 may utilize the middle color component as the modified middle color component. At sub-process block 368, the processor core complex 18, the image processing circuitry 28, or both the processor core complex 18 and the image processing circuitry 28 may output the middle color component as the modified middle color component 354.

Continuing with the discussion of the process 350A, at process block 356, the processor core complex 18, the image processing circuitry 28, or both the processor core complex 18 and the image processing circuitry 28 may perform a minimum color component modification to generate the modified minimum color component 358. As discussed below, several operations may performed at process block 356.

For example, at sub-process block 374, the processor core complex 18, the image processing circuitry 28, or both the processor core complex 18 and the image processing circuitry 28 may determine a minimum color adjustment value for a region 52 (e.g., the region 52 identified at sub-process block 290 of the process 270). As noted above, the minimum color adjustment value may correspond to a setting of a slider 144 (e.g., a c_min slider) as indicated by a user input or a default value (e.g., when no user input has been made using the slider 144). In one embodiment, the minimum color adjustment value may be a value between zero and one, inclusive.

At sub-process block 376, the processor core complex 18, the image processing circuitry 28, or both the processor core complex 18 and the image processing circuitry 28 may determine a minimum color factor based on the minimum color adjustment value. The minimum color factor may be determined according to Equation 6:

$$F_{C_{min}} = 1 - \frac{C_{mid} - C_{min}}{C_{max} - C_{min}} \times A_{C_{min}} \quad \text{Equation 6}$$

where $F_{Cmin}$ is the minimum color factor, $C_{mid}$ is the middle color component (e.g., as received at process block 272 of the process 270), $C_{min}$ is the minimum color component (e.g., as received at process block 272 of the process 270), $C_{max}$ is the maximum color component (e.g., as received at process block 272 of the process 270), and $A_{Cmin}$ is the minimum color adjustment value.

The minimum color factor may be determined by the regionalization setting determination circuitry 316. In some embodiments, the regionalization setting determination circuitry 316 may be implemented by executing computer-readable instructions (e.g., instructions stored in the local memory 20 or main memory storage device 22) using the processor core complex 18, the image processing circuitry 28, or both the processor core complex 18 and the image processing circuitry 28. In other embodiments, the regionalization setting determination circuitry 316 may be implemented physically. For example, FIG. 20 is a block diagram of an embodiment of the regionalization setting determination circuitry 316, which may be separate from or included (partially or wholly) within the processor core complex 18, the image processing circuitry 28, or both the processor core complex 18 and the image processing circuitry 28. It should be noted that the input values shown in FIG. 20 pertain to process 350B of FIG. 19B, which, as discussed below, is an alternative process for generating modified image data that may be utilized in lieu of the process 350A. As such, FIG. 20 is discussed in more detail below in relation to the process 350B.

Returning to FIG. 19A and the discussion of the process 350A, at sub-process block 378, the processor core complex 18, the image processing circuitry 28, or both the processor core complex 18 and the image processing circuitry 28 may determine a modified minimum color component based on the minimum color factor (sub-process block 378). More specifically, the pixel modification circuitry 318 may determine the modified minimum color component in accordance with Equation 7:

$$C_{min,modified} = C_{min} \times F_{Cmin} \qquad \text{Equation 7}$$

where $C_{min,modified}$ is the modified minimum color component 358.

At sub-process block 380, the processor core complex 18, the image processing circuitry 28, or both the processor core complex 18 and the image processing circuitry 28 may output the modified minimum color component 358 generated by performed the operations discussed above with respect to sub-process blocks 374, 376, 378. Accordingly, the process 350A may be performed to generate modified image data that includes the modified middle color component 354 and modified minimum color component 358.

Figure 19B:
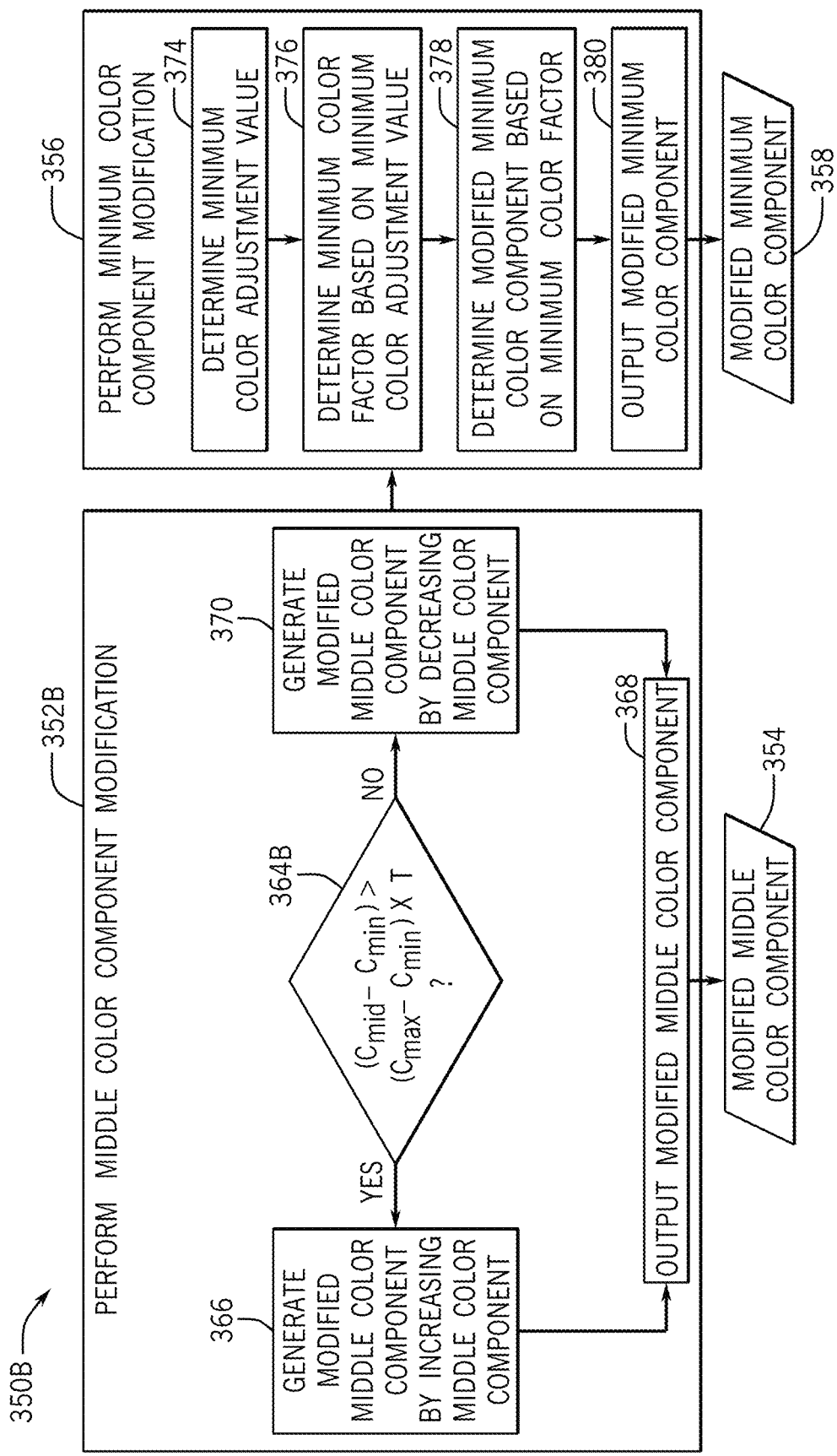
FIG. 19B is a flow diagram of another process for generating modified image data, in accordance with an embodiment.

Turning now to FIG. 19B, as noted above, modified image data may also be generated in accordance with process 350B. In other words, the process 350B may be another manner in which modified image data is generated at sub-process block 292 of the process 270. Accordingly, the process 350B may be performed as sub-process block 292 of the process 270, portions of the process 350B may be performed as sub-process block 292, or the process 350B may be performed as part of sub-process block 292 of the process 270 discussed above with respect to FIG. 17. The process 350B may be performed for each pixel of image data that is to be modified (e.g., as determined as decision block 274 of process 270). The process 350B may also be performed on a region-wide basis, meaning the process 350B may be performed for each region 52 of the color wheel 50 for which there is image data to be modified. In some embodiments, the process 350B may be implemented at least in part based on circuit connections formed (e.g., programmed) in the processor core complex 18, the image processing circuitry 28, or both (e.g., partially or completely) the processor core complex 18 and the image processing circuitry 28. The process 350B may also be implemented using image data processing circuitry 300 as well as the circuitry discussed below with respect to FIG. 20. Additionally or alternatively, the process 350B may be implemented at least in part by executing instructions stored in a tangible non-transitory computer-readable medium, such as the local memory 20, using processing circuitry, such as the processor core complex 18, image processing circuitry 28, or both the processor core complex 18 and the image processing circuitry 28.

The process 350B is generally similar to the process 350A in that the process 350B shares several operations in common with the process 350A. For example, the process 350B also generally includes performing a middle color component modification (process block 352B) to generate a modified middle color component 354 and performing a minimum color component modification (process block 356) to generate a modified minimum color component 358. In the process 350B, minimum color component modification (process block 356) may be performed in the same manner as discussed above with respect to the process 350A. However, the modification of the middle color component (process block 352B) may be performed in a similar yet different manner than process block 352A of the process 350. For example, process block 352B includes sub-process blocks 366, 368, 370, each of which may be performed as discussed above with respect to process block 352A of the process 350A. However, in the process 350B, the decision of when to modify the middle color component is different (e.g., sub-process block 364B), and, as can be gleaned from comparing FIG. 19A to FIG. 19B, the process 350B does not include sub-process blocks 360, 362, 372.

In particular, at sub-process block 364B, the processor core complex 18, the image processing circuitry 28, or both the processor core complex 18 and the image processing circuitry 28 may determine whether a difference of the middle color component and the minimum color component is greater than a product of the value of the threshold for a region 52 (e.g., the region 52 determined at sub-process block 290 of the process 270) and a difference of the maximum color component and the minimum color component. Such a determination may be made by the pixel modification circuitry 318. When the difference of the middle color component and the minimum color component is greater than the product of the value of the threshold for a region 52 and the difference of the maximum color component and the minimum color component, at sub-process block 366, the modified middle color component 354 may be generated as discussed above with respect to the process 350. However, when the difference of the middle color component and the minimum color component is less than or equal to the product of the value of the threshold for a region 52 and the difference of the maximum color component and the minimum color component, at process block 370, the modified middle color component 354 may be generated as discussed above with respect to the process 350. As such, in the illustrated embodiment of process block 352B, the middle color component will either be increased or reduced to generate the modified middle color component 354. Thus, when performing sub-process block 292 of the process 270 (as discussed above with respect to the processes 350A, 350B), it is possible that only the middle color component and minimum color component may be modified when generating modified image data. In other words, the maximum color component may not be modified.

It should also be noted that, in some embodiments, the processes 350A, 350B may include fewer operations than those described below. As such, the processes 350A, 350B may be performed using only a portion of the operations discussed above with respect to FIG. 19A and FIG. 19B.

Having discussed how modified image data may be generated, the discussion will now return to FIG. 20 and how the regionalization setting determination circuitry 316 may generate the minimum color factor ($F_{Cmin}$ above and "C_min factor" in FIG. 20) used to generate the modified minimum color component 358 as well as the enhancement factor ($F_{enhance}$ above and "enhancement factor" in FIG. 20)

and reduction factor ($F_{reduce}$ above and "reduction factor" in FIG. 20) that may be used to generate the modified middle color component 354.

For example, the regionalization setting determination circuitry 316 may include a look-up table 400 that receives a value equal to a difference between the value of the maximum color component and the minimum color component. The difference may be a value between zero and 255, inclusive. As such, the look-up table 400 may be a 256-value look-up table. The look-up table may output a value equivalent to the reciprocal of the received value.

The regionalization setting determination circuitry 316 also includes multiplier 402, which may receive the reciprocal value output by the look-up table 400. As indicated in FIG. 20, the regionalization setting determination circuitry 316 may also include round and shift circuitry and one's complement circuitry.

In the case of determining the minimum color factor, the multiplier 402 may output the reciprocal value. In other words, when determining the minimum color factor, the multiplier 402 may output the received reciprocal value without performing multiplication (or instead by multiplying the reciprocal value by one). The reciprocal value (e.g., as rounded and shifted) may be received by minimum color factor circuitry 404, where more operations may take place to generate the minimum color factor. More specifically, the minimum color factor circuitry 404 may include a multiplier 406 that receives the reciprocal value and the value of the minimum color adjustment, determines a product of the reciprocal value and the value of the minimum color adjustment, and output the product. The product (or the one's complement of the product) may be multiplied a value equal to the difference between the middle color component and the minimum color component by multiplier 408 of the minimum color factor circuitry 404 to generate a second product. This second product (e.g., as rounded and shifted) may be output as the minimum color factor.

In the case of determining the reduction factor and the enhancement factor, the multiplier 402 may multiply the reciprocal value received from the look-up table 400 by a value received from a multiplexer 410. In particular, the multiplexer receives two values as inputs as well as another value (e.g., a zero or one). The two values received as inputs may be equivalent to the values of the numerators of fractions in Equation 3 and Equation 5. The other value is indicative of whether a difference of the middle color component and the minimum color component is less than or equal to a product of the threshold for the region 52 (e.g., as determined at sub-process block 290) and a difference of the maximum color component and the minimum color component. For example, when the difference of the middle color component and the minimum color component is less than or equal to the product of the threshold for the region 52 and the difference of the maximum color component and the minimum color component, the multiplexer 410 may receive a one and output the received input that is equivalent to the value of the numerator of the fraction in Equation 5. When the difference of the middle color component and the minimum color component is greater than the product of the threshold for the region 52 and the difference of the maximum color component and the minimum color component, the multiplexer 410 may receive a zero and output the received input that is equivalent to the value of the numerator of the fraction in Equation 3. The product generated by the multiplier 402 may be output, and middle color modification circuitry 412 may receive the product (e.g., as rounded and shifted).

The middle color modification circuitry 412 may perform further operations on the received product and ultimately output the reduction factor or enhancement factor (depending on how the middle color value will be modified). For example, multiplier 414 may receive the product as well as an output of multiplexer 416. The multiplexer 416 may receive two input values (e.g., the reciprocal of the threshold of the region 52 and the reciprocal of the difference of one and the threshold of the region 52). The multiplexer 416 may also receive a signal (e.g., a zero or one, with the value being as the value utilized by the multiplexer 410 to determine which input to select) and selectively choose one of the input values as the output. The multiplier 414 may determine a second product by multiplying the product received from the multiplier 402 (e.g., as rounded and shifted) and the value received from the multiplexer 416 and also output the second product. Depending on whether enhancement factor or the reduction factor is being determined, the second product (e.g., as output or as rounded and shifted or a one's complement of the product as rounded and shifted) may respectively be equal to the term of Equation 3 or Equation 5 that is to be raised to the power P.

Exponent circuitry 418 of the middle color modification circuitry 412 may perform further operations on the second product (e.g., as output or as rounded and shifted or a one's complement of the product as rounded and shifted) and output the reduction factor or the enhancement factor (depending on which is being determined). As illustrated, multiplexer 420 may receive one input that is a rounded and shifted second product as well as another input that is the one's complement of the rounded and shifted second product. The multiplexer 420 may also receive a (e.g., a zero or one, with the value being as the value utilized by the multiplexer 410 to determine which input to select) and selectively choose one of the input values as the output. The output of the multiplexer 420 may be received by multiplier 422 and squared (i.e., multiplied by itself) by the multiplier 422.

Multiplexer 424 may receive the product generated by the multiplier 422 (e.g., as rounded and shifted) as an input as well as the output of the multiplexer 420 as another input. The multiplexer 424 may also receive a signal (e.g., a one or zero) indicative of whether the power value (i.e., P in Equation 3 or Equation 5, depending on whether the reduction factor or enhancement factor is being determined (with the value of P itself being dependent upon which region 52 is identified at sub-process block 290 of the process 270)) is equal to four. When the power value is equal to four, the multiplexer 424 may output the product (e.g., as rounded and shifted) generated by the multiplier 422. When the power value is not equal to four, the multiplexer 424 may output the value received from the multiplexer 420.

In this manner, multiplier 426 may either determine a product equivalent to the output of the multiplexer 420 raised to the third power or the output of the multiplexer 420 raised to the fourth power. More specifically, the multiplier 426 may receive the product (e.g., as rounded and shifted) output from the multiplier 422 (which is equivalent to the output of the multiplexer 420 raised to the second power) and the output of the multiplexer 424, which is either the output of the multiplexer 420 (when the power value is three) or the product output by the multiplier 422 (when the power value is four). The multiplier 426 may then multiply the received values and output a product that is equivalent either to the output of the multiplexer 420 raised to the third power or the output of the multiplexer 420 raised to the fourth power (depending on whether the power value is equal to four).

A multiplexer 428 may receive the product (e.g., as rounded and shifted) generated by the multiplier 422 as well as the product (e.g., as rounded and shifted) generated by the multiplier 426 and selectively output one of the received products based on a control signal (e.g., a zero or one) that is indicative of whether the power value is two. When the power value is two, the multiplexer 428 may output the product (e.g., as rounded and shifted) generated by the multiplier 422. When the power value is not two, the multiplexer 428 may output the product (e.g., as rounded and shifted) generated by the multiplier 426. When determining enhancement factor, the enhancement factor may be equivalent to the one's complement of the output of the multiplexer 428, whereas, when determining the reduction factor, the reduction factor may be the output of the multiplexer 428. In this manner, the regionalization setting determination circuitry 316 may determine the values of the minimum color adjustment factor, reduction factor, and enhancement factor.

Figure 21:
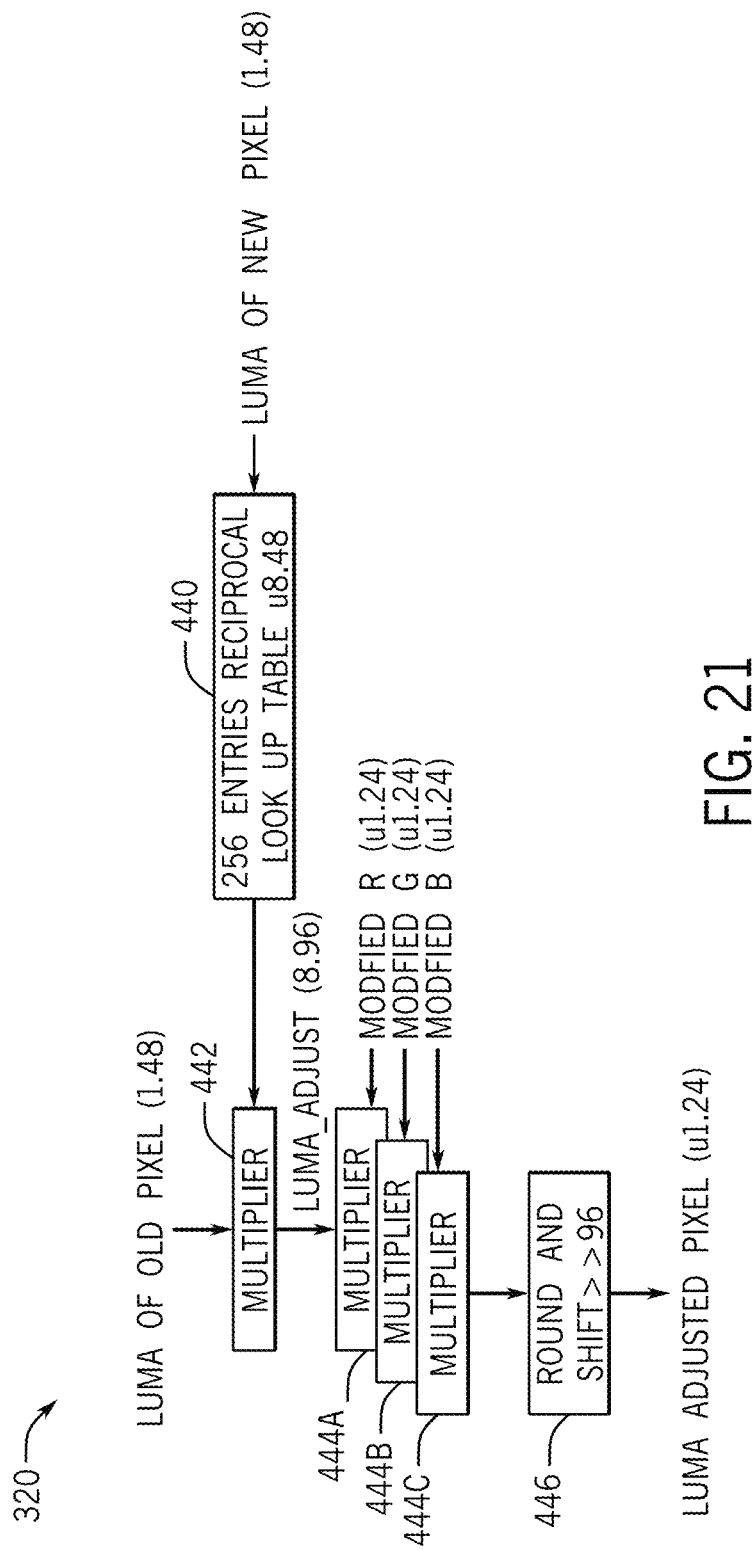
FIG. 21 is a block diagram of the luma adjustment circuitry of FIG. 18, in accordance with an embodiment.

Returning to FIG. 17 and the discussion of generating adjusted image data (process block 280) in the process 270, at sub-process block 294, the processor core complex 18, the image processing circuitry 28, or both the processor core complex 18 and the image processing circuitry 28 may perform a luma adjustment to generate luma-adjusted pixel data. Luma-adjusted pixel data may be generated for each pixel of the electronic display 12 (e.g., that will be utilized to display image data such as a frame of image content). Referring to FIG. 18, luma adjustment circuitry 320 may receive modified color component values generated by the pixel modification circuitry 318 (e.g., modified middle color component 354, modified minimum color component 358, and the maximum color component) as well as pixel data indicative of the color components of the original image data (e.g., as output by degamma circuitry 310). Turning now to FIG. 21, the luma adjustment circuitry 320 may include a look-up table 440 that receives a value for the luma of a modified pixel. The modified pixel may have RGB values based on values generated by degamma circuitry 310 and pixel modification circuitry 318. For example, the maximum color component of the modified pixel may be the maximum color component generated by degamma circuitry 310 (e.g., a value unmodified by the pixel modification circuitry 318), whereas the middle color component and minimum color component of the modified pixel may respectively be the modified middle color component 354 and modified minimum color component 358 generated at sub-process block 292 of the process 270. In one embodiment, the value of the luma for the modified pixel may be determined by the processor core complex 18, the image processing circuitry 28, or both the processor core complex 18 and the image processing circuitry 28 in accordance with Equation 8:

$$\text{Luma}=0.229R+0.587G+0.114B \quad \text{Equation 8}$$

where Luma is the luma, R is the value of the red component of the modified pixel, G is the value of the green component of the modified pixel, and B is the value of the blue component of the modified pixel. The look-up table 440 may output a value that is the reciprocal of the luma of the modified pixel.

The luma adjustment circuitry 320 also includes a multiplier 442 that may multiply the value output by the look-up table 440 by the luma of the unmodified pixel. The luma of the unmodified pixel may be determined by the processor core complex 18, the image processing circuitry 28, or both the processor core complex 18 and the image processing circuitry 28 using Equation 8 in which the RGB values generated by the degamma circuitry 310 are utilized.

The product determined and output by the multiplier 442 may then be multiplied by multipliers 444 (referring collectively to multipliers 444A, 444B, 444C). More specifically, multiplier 444A may multiply the product generated by the multiplier 442 and the value of red value (i.e., the R value of the RGB values of the modified pixel), multiplier 444B may multiply the product generated by the multiplier 442 and the value of green value (i.e., the G value of the RGB values of the modified pixel), and multiplier 444C may multiply the product generated by the multiplier 442 and the value of blue value (i.e., the B value of the RGB values of the modified pixel). The values generated by the multipliers 444 may be rounded and shifted by rounding and shifting circuitry 446, and the rounded and shifted values may be output as luma-adjusted pixel data. Thus, the luma-adjusted pixel data may include luma-adjusted RGB values.

At sub-process block 296, processor core complex 18 the image processing circuitry 28, or both the processor core complex 18 and the image processing circuitry 28 may perform gamma adjustment. For example, referring briefly to FIG. 18, engamma look-up table 322 may receive the luma-adjusted pixel data generated by the luma adjustment circuitry 320 and may gamma encode the luma-adjusted pixel data by outputting RGB values based on the indicated by the engamma look-up table 322. The values output at sub-process block 296 may be the adjusted image data that is utilized by the electronic display 12 to display content that has been modified based on user-selected settings (e.g., placement of the sliders 144).

Returning to FIG. 17, at process block 278, the image processing circuitry 28, or both the processor core complex 18 and the image processing circuitry 28 may output the adjusted image data. For example, the adjusted image data may be provided to the electronic display 12, and the electronic display 12 may generate image content using the adjusted image data (e.g., to perform process block 168 of the process 160). In some embodiments, the operations associated with sub-process block 286 (e.g., operations associated with denormalizing color components) may be performed immediately before the adjusted image data is output. As such, the image data (e.g., color components) that has been modified (e.g., as modified at one or more of sub-process blocks 292, 294, 296) may be denormalized, and the denormalized color components may be output as the adjusted image data at process block 278. The adjusted image data, when displayed, may result in images such as images 70C, 120C, 140B.

Accordingly, the technical effects of the present disclosure include enabling electronic devices to generate image data that is modified (e.g., for users with color vision deficiency) in a user-specific manner to better enable users to discern between colors in displayed image content. Thus, the techniques described herein enable electronic device to generate improved image content.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:
a display; and
processing circuitry communicatively coupled to the display, wherein the processing circuitry is configured to:
receive source image data indicative of color components for a pixel of the source image data, wherein the color components comprise a maximum color component, a middle color component, and a minimum color component;
classify the pixel into a color region from among a plurality of color regions based on which of the color components are the maximum color component, the middle color component, and the minimum color component, wherein the color region is associated with a zone of confusion of a color vision deficiency; and
generate adjusted image data to cause adjustment of the zone of confusion by modifying one or more of the color components based at least in part on the classification.

2. The electronic device of claim 1, wherein the one or more of the color components comprise the middle color component, the minimum color component, or both the middle color component and the minimum color component.

3. The electronic device of claim 1, wherein the color components comprise normalized color components, degamma color components, or degamma normalized color components generated from the source image data.

4. The electronic device of claim 1, wherein the processing circuitry is further configured to generate, based at least in part on the adjusted image data, image data configured for display on the display.

5. The electronic device of claim 1, wherein the processing circuitry is configured to:
determine that a condition associated with the color components is met; and
based on the condition being met, classify the pixel into the color region.

6. The electronic device of claim 1, wherein the plurality of color regions are associated with a color wheel.

7. The electronic device of claim 6, wherein the plurality of color regions comprises six color regions.

8. The electronic device of claim 1, wherein the processing circuitry is further configured to:
receive a signal indicative of a user input interaction with one or more graphical user interface (GUI) elements of the display; and
generate the adjusted image data by modifying the one or more of the color components based at least in part on the user input interaction.

9. The electronic device of claim 8, wherein:
the signal is indicative of the user input interaction being with a GUI element associated with the minimum color component; and
the processing circuitry is further configured to generate the adjusted image data by modifying the minimum color component based at least in part on the user input interaction with the GUI element.

10. The electronic device of claim 8, wherein:
the signal is indicative of the user input interaction being with a GUI element associated with the middle color component; and
the processing circuitry is further configured to generate the adjusted image data by modifying the middle color component based at least in part on the user input interaction with the GUI element.

11. The electronic device of claim 10, wherein the processing circuitry is further configured to:
determine, based on a comparison to a threshold value, whether to modify the middle color component by enhancing the middle color component or reducing the middle color component; and
generate the adjusted image data by enhancing the middle color component or reducing the middle color component based at least in part on the comparison to the threshold value.

12. A non-transitory, computer-readable medium comprising instructions that, when executed, cause processing circuitry to:
receive source image data indicative of color components for a pixel of the source image data, wherein the color components comprise a maximum color component, a middle color component, and a minimum color component;
classify the pixel into a color region from among a plurality of color regions based which of on the color components are the maximum color component, the middle color component, and the minimum color component, wherein the color region is associated with a zone of confusion of a color vision deficiency; and
generate adjusted image data to cause adjustment of the zone of confusion by modifying one or more of the color components based on the classification, wherein the one or more of the color components comprise the middle color component, the minimum color component, or both the middle color component and the minimum color component.

13. The non-transitory, computer-readable medium of claim 11, wherein, the instructions, when executed, cause the processing circuitry to:
determine regionalization configuration settings for each color region of the plurality of color regions; and
modify the one or more of the color components based on the regionalization configuration settings for the color region of the plurality of color regions.

14. The non-transitory, computer-readable medium of claim 12, wherein the instructions, when executed, cause the processing circuitry to:
receive, based on a user input with a graphical user interface (GUI), a signal indicative of a request to modify image content for color vision deficient users; and
generate the adjusted image data after receiving the signal.

15. The non-transitory, computer-readable medium of claim 12, wherein the instructions, when executed, cause the processing circuitry to:
receive a second signal indicative of a second user input interaction with one or more GUI elements of a second GUI; and
alter, based on the second signal, generation of the adjusted image data by modifying the one or more of the color components.

16. The non-transitory, computer-readable medium of claim 12, wherein:
the source image data is indicative of second color components for a second pixel of the source image data; and
the instructions, when executed, cause the processing circuitry to:
when the second color components are equal to one another, generate second adjusted image data for the second pixel by utilizing the second color components;
when the second color components are not equal to one another, generate the second adjusted image data by modifying one or more of the second color components; and
cause display of second image content using the second adjusted image data.

17. A computer-implemented method, comprising:
receiving, via processing circuitry, source image data indicative of color components for a pixel of the source image data, wherein the color components comprise a maximum color component, a middle color component, and a minimum color component;
classifying, by the processing circuitry, the pixel into a color region from among a plurality of color regions based on which of the color components are the maximum color component, the middle color component, and the minimum color component, wherein the color region is associated with a zone of confusion of a color vision deficiency; and
generating, by the processing circuitry, adjusted image data to cause adjustment of the zone of confusion by modifying one or more of the color components based on the classification.

18. The computer-implemented method of claim 17, wherein:
the color components comprise a red component, a green component, and blue component; and
the plurality of color regions comprises:
one or more first color regions in which the red component is the maximum color component;
one or more second color regions in which the green component is the maximum color component; and
one or more third color regions in which the blue component is the maximum color component.

19. The computer-implemented method of claim 17, wherein generating the adjusted image data comprises:
normalizing, by the processing circuitry, original color components of the source image data to generate normalized color components; and
determining, by the processing circuitry, degamma values for the normalized color components.

20. The computer-implemented method of claim 19, wherein generating the adjusted image data further comprises:
generating modified image data by modifying the middle color component, the minimum color component, or both the middle color component and the minimum color component;
performing a luma adjustment on the modified image data to generate luma-adjusted pixel data; and
gamma encoding the luma-adjusted pixel data.

* * * * *